(12) United States Patent
Konno et al.

(10) Patent No.: US 7,423,716 B2
(45) Date of Patent: Sep. 9, 2008

(54) LIQUID CRYSTAL DISPLAY DEVICE WITH MOUND-LIKE INSULATING FILM FORMED ON VIDEO LINE COVERED BY A COMMON ELECTRODE WITH EDGES OF THE MOUND POSITIONED ON LIGHT SHIELD ELECTRODE

(75) Inventors: Takayuki Konno, Kanagawa (JP); Shinichi Nishida, Kanagawa (JP); Mamoru Okamoto, Kanagawa (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 529 days.

(21) Appl. No.: 11/023,687

(22) Filed: Dec. 29, 2004

(65) Prior Publication Data

US 2005/0152230 A1   Jul. 14, 2005

(30) Foreign Application Priority Data

Jan. 8, 2004   (JP)   ............................. 2004-002782

(51) Int. Cl.
*G02F 1/1343*   (2006.01)
(52) U.S. Cl. ...................... 349/141; 349/110; 349/138
(58) Field of Classification Search ................ 349/106, 349/141, 110, 138
See application file for complete search history.

(56) References Cited

U.S. PATENT DOCUMENTS

| | | | | |
|---|---|---|---|---|
| 6,816,221 B2* | 11/2004 | Oke et al. | ................... | 349/141 |
| 6,897,930 B2* | 5/2005 | Nakayoshi et al. | .......... | 349/139 |
| 7,092,049 B2* | 8/2006 | Kadotani et al. | ............ | 349/110 |
| 7,256,851 B2* | 8/2007 | Park | ........................... | 349/141 |

FOREIGN PATENT DOCUMENTS

| | | |
|---|---|---|
| JP | 09-015629 | 1/1997 |
| JP | 10-020338 | 1/1998 |
| JP | 10-073844 | 3/1998 |
| JP | 11-119237 | 4/1999 |
| JP | 2000-089240 | 3/2000 |
| JP | 2001-033815 | 2/2001 |
| JP | 2002/0081133 | 10/2002 |
| JP | 2002-323706 | 11/2002 |
| JP | 2003-0079809 | 10/2003 |

OTHER PUBLICATIONS

Korean Office Action dated Aug. 25, 2006, with partial English translation.
Japanese Office Action dated Mar. 21, 2008, with English translation.

* cited by examiner

*Primary Examiner*—David C. Nelms
*Assistant Examiner*—John Heyman
(74) *Attorney, Agent, or Firm*—McGinn IP Law Group, PLLC

(57) ABSTRACT

An active matrix type liquid crystal display device in the lateral electric field system is disclosed, in which a high aperture factor is ensured even in a narrow pitch case, while also ensuring high contract and reduced vertical stroke is disclosed. In a liquid crystal display device, in which substantially bank-like third insulating film 208 is formed a video signal line 204 and covered by a common electrode 210, a light shield electrode 213 is formed underneath an extension of a common electrode 210 from an edge of a video signal line 204. With this arrangement, a liquid crystal display device is realized, which shields light from the sides of a step part as well as ensuring high aperture factor and high contrast.

20 Claims, 21 Drawing Sheets

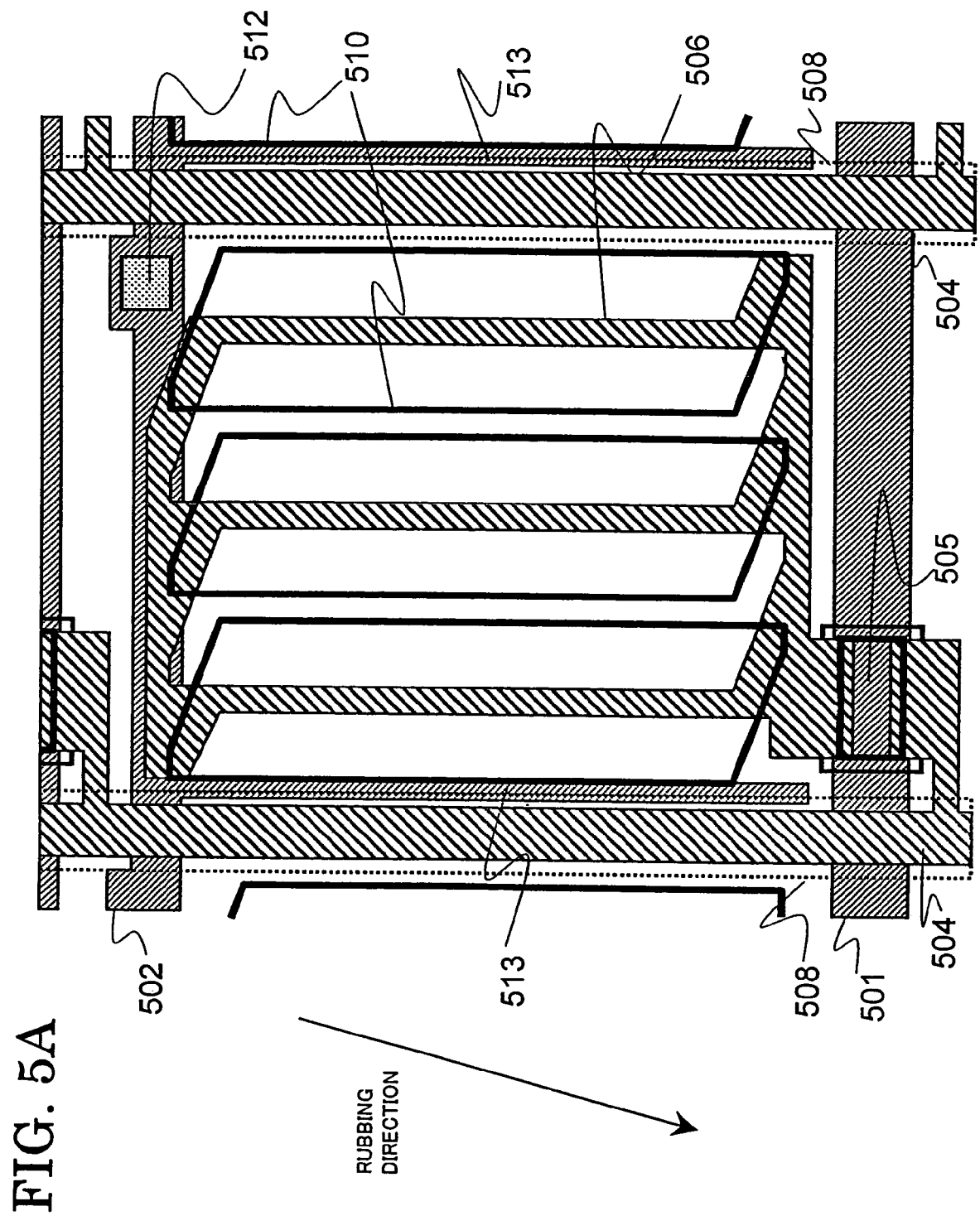

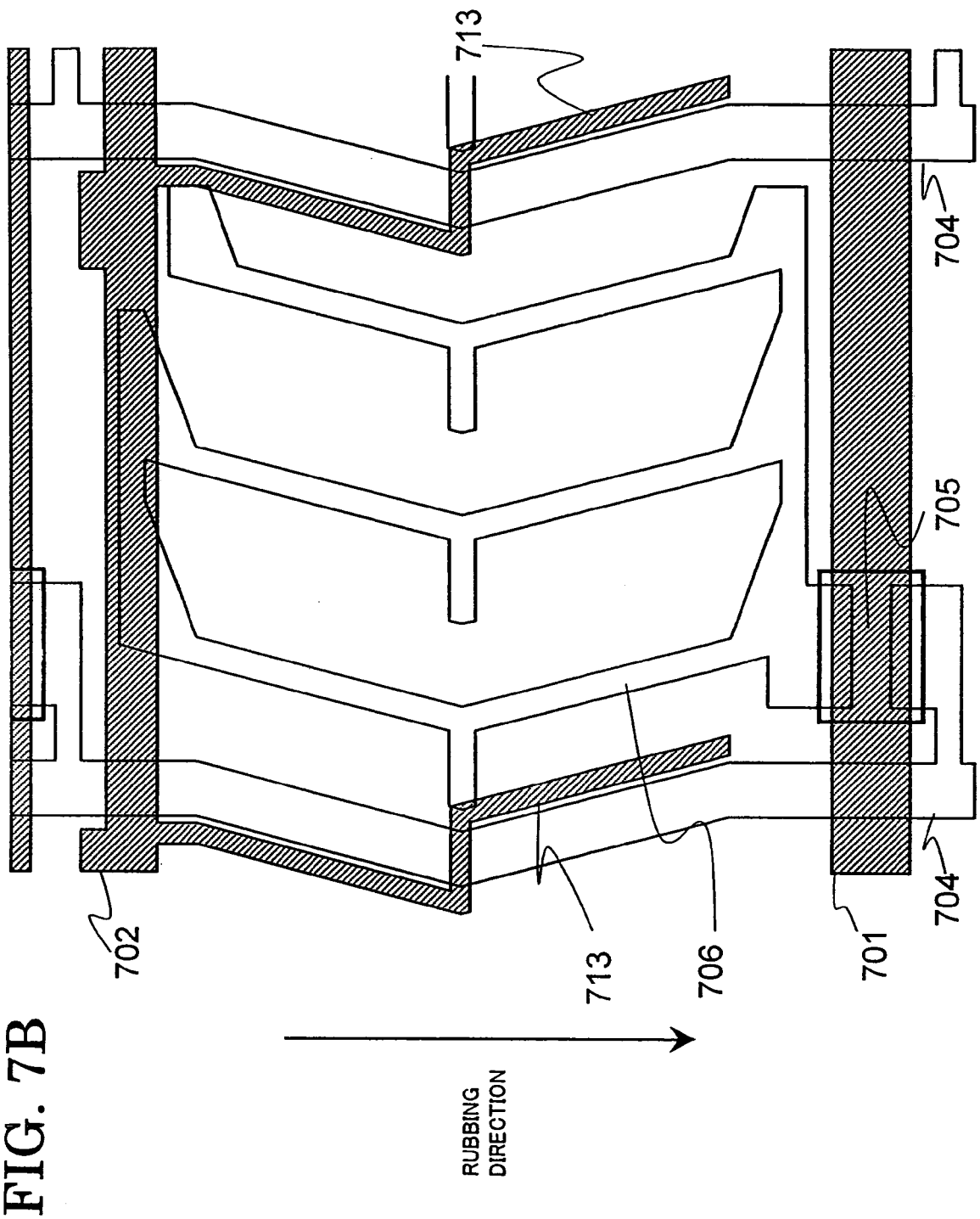

LIQUID CRYSTAL DISPLAY DEVICE WITH MOUND-LIKE INSULATING FILM FORMED ON VIDEO LINE COVERED BY A COMMON ELECTRODE WITH EDGES OF THE MOUND POSITIONED ON LIGHT SHIELD ELECTRODE

BACKGROUND OF THE PRESENT INVENTION

This application claims benefit of Japanese Patent Application No. 2004-002782 filed on Jan. 8, 2003, the contents of which are incorporated by the reference.

The present invention relates to liquid crystal display devices and, more particularly, to active matrix type liquid crystal display devices in lateral electric field system capable of obtaining high aperture factor and high contrast.

The TN (twisted nematic) system which has heretofore been broadly used, ensures high contrast. On the demerit side, however, the molecular axis of liquid crystal is raised by perpendicular electric field. This means a problem of pronounced visual field angle dependency. Recently, demands for systems for large size monitors such as TV sets are increasing, and an IPS (In-Plane Switching) system has been broadly adopted. In the IPS system, for the display the molecular axis of the liquid crystal is rotated by lateral electric field in a plane parallel to substrate. Thus, the visual field angle dependency on the rising angle of the molecular axis is precluded, and the visual field angle characteristic is greatly improved compared to the TN system.

While the IPS system liquid crystal display device features visual field angle characteristic improvement, it has the following problems. In this system, pixel electrode and common electrode for each pixel are arranged in a comb-teeth fashion. Therefore, the electrode area ratio to the display area is high, and the aperture factor is low. In addition, since the system adopts the lateral electric field drive, the liquid crystal molecules in the display area are adversely affected by the leaking electric field from the video signal line, thus giving rise to occurrence of longitudinal crosstalk.

Some solution measures with respect to the above problems have been proposed. One of such measures is disclosed in a prior art liquid crystal display device described before with reference to FIGS. 10A and 10B (see Literature 1: Japanese Laid-open 2002-323706, for instance). FIG. 10A is a plan view, and FIG. 10B is a sectional view showing a specified parts. A scanning signal line 1001 and a common signal line 1002 are formed from a first metal layer. A first insulating film 1003 is formed on the scanning signal line 1001 and the common signal line 1002. On the first insulating film 1003 a video signal line 1004, a thin film transistor 1005 and a source electrode 1006 are formed from a second metal layer. A second insulating film 1007 is formed on the video signal line 1004, the thin film transistor 1005 and the source electrode 1006. A transparent insulating film 1008 is then coated on the entire surface of the second insulating film 1007. A pixel electrode 1009 and a common electrode 1010 are then formed as transparent electrodes on the third insulating film 1008. The video signal line 1004 is perfectly covered by the common electrode line 1010 via the second and third insulating films 1007 and 1008. The pixel electrode 1009 and the common electrode 1010 are electrically connected via contact holes 1011 and 1012 to the source electrode 1006 and the common signal line 1002, respectively.

With the comb-teeth arrangement of the pixel electrode 1009 and the common electrode 1010 both formed as transparent electrodes, the areas on the electrodes contribute to the transmittivity. It is proved by simulation that, considering the contribution on the transparent electrodes, the effective aperture factor is improved by about 8%. With the arrangement that the video signal line is perfectly covered by the common electrode, it is possible to expand the aperture part up to the vicinity of the video signal line. In addition, with the shielding of the leakage electric field from the video signal line by the common electrode, an effect of reducing the longitudinal crosstalk is obtainable. This arrangement generates a load capacity between the video signal line and the common electrode. However, with the presence of the low dielectric factor insulating film, it is possible to suppress the load capacity down to a range which is free from any problem in the driving.

FIGS. 11A and 11B disclose a liquid crystal display device based on a different solution measure, which was proposed by the same Applicant as that of this application and was not published (not prior art), (Literature 2: Japanese Patent Application No. 2003-076169, for instance). FIG. 11A is a plan view, and FIG. 11B is a sectional view showing specific parts. A scanning signal line 1101 and a common signal line 1102 are formed from a first metal layer. A first insulating film 1103 is formed on the scanning signal line 1101 and the common signal line 1102. A video signal electrode 1104, a thin film transistor 1105 and the source 1106 are formed from a second metal layer on the first insulating film 1103. A second insulating film 1107 is formed on the video signal line 1104, the thin film transistor 1105 and the source electrode 1106. A third insulating film 1108 is coated on the second insulting film 1107. The third insulating film 1108 is formed in a bank-like fashion so that it remains on only the video signal line 1104. Then, a pixel electrode 1109 and a common electrode 1110 are formed as transparent electrodes. The video signal line 1104 is perfectly covered by the common electrode 1110 via the second and bank-like third insulating films 1107 and 1108. The pixel electrode 1109 and the common electrode 1110 are electrically connected via contact holes 1111 and 1112 to the source electrode 1106 and the common signal line 1102, respectively.

This solution measurement is different from that disclosed in Literature 1 in that the third insulting film 1108 is formed in a bank-like fashion so as to remain on only the video signal line 1104, while it is the same in such performance as the effective aperture factor. With this measure, since the third insulating film 1108 does not remain on the aperture part, it is possible to use a colored film as the third insulating film 1108. In the case of the full surface coating, the third insulating film 1108 has to be necessarily transparent. However, acrylic acid organic films and the like are expensive. On the other hand, novolak organic films or like colored films are inexpensive, and permit realizing the comparative performance at low cost.

This prior art technique, however, has other problems. With the arrangement in which the transparent insulating film is coated on the entire surface as disclosed in Literature 1, it is empirically proved that the extent of extension of the common electrode from each edge of the video signal line should be at least 6 µm in order to be able to sufficiently shield the leaking electric field from the video signal line. In the Literature 1 prior art technique, the electric field shielding effect is improved owing to the sectional shape of enclosing the video signal line. However, like the Literature 12 prior art technique, the pixel electrode and the common electrode are both formed as uppermost layers. This means that at least two contact holes are necessarily pixel. In either case, the narrower the pitch, the ratio of occupation of the extension of the common electrode and the contact holes in the ratio is the greater, leading to less effect of aperture factor improvement.

Also, the narrower the pitch, the adverse effects of the leaking electric field from the video signal line are the greater, leading to less effect of the longitudinal crosstalk reduction.

As a measure for solving the above problems, a liquid crystal display device as shown in FIGS. 12A and 12B is disclosed, which was proposed by the same Applicant as that of this application and was not published (not prior art), (Literature 3: Japanese Patent Application No. 2002-164681, for instance). FIG. 12A is a plan view, and FIG. 12B is a sectional view showing specified parts. A scanning signal line 1201 and a common signal line 1202 are formed from a first metal layer on a first substrate. A first insulating film 1203 is formed on the scanning signal line 1201 and the common signal line 1202. On the first insulating film 1203 is formed, from a second metal layer, a pixel electrode 1206 which is integral with a video signal line 1204, a thin film transistor 1205 and a source electrode. With this arrangement, a pixel electrode 1206 requires no contact hole. A second insulating film 1207 is formed on the pixel electrode 1206 integral with the video signal line 1204, the thin film transistor 1205 and the source electrode. A third insulating film 1208 is coated on the entire surface of the second insulating film 1207. If a common electrode is formed as a transparent electrode on the third insulating film 1208, it greatly increases the drive voltage due to the fact that it is a comb-teeth line formed from a different layer. Accordingly, for the purpose of reducing the load capacity, the third insulating film 1208 is formed in a bank-like shape so that it remains only on the video signal line 1204. Then, the common electrode 1210 is formed as a transparent electrode. The common electrode 1210 is electrically connected via the contact hole 1212 to the common signal line 1202. Like the Literature 2 prior art technique, the third insulating film 1208 may be transparent or colored.

Like the Literature 2 prior art technique, the video signal line is perfectly covered by the common electrode via the second and bank-like third insulating films. Also, like the Literature 2 prior art techniques, the video signal line has a sectional shape enclosed by the common electrode. Thus, it is possible to obtain an improved effect of shielding the leaking electric field from the video signal line compared to the Literature 1 prior art technique. It is empirically proved that for sufficiently shielding the leaking electric field from the video signal line, the extension of the common electrode from each edge of the video signal line may be 4 μm.

A shown, the number of necessary contact holes is reduced by one, and also extension of the common electrode from each video signal line edge can be reduced. It is thus possible to obtain high aperture factor. However, since the pixel electrode is formed as a metal electrode, the contribution on the transparent electrodes is lower than in the prior art example. However, simulation proves that the effective aperture factor is increased by 5%. In consequence, it is possible to obtain improved aperture factor and more suppress longitudinal stroke compared to the Literatures 1 and 2 prior art techniques.

As shown above in connection with the Literature 1 to 3 prior art techniques, the third insulating film interposed between the video signal line and the common electrode covering the same, are formed in a bank-like fashion along the video signal line, it is possible to realize cost reduction and aperture factor improvement.

However, with the third insulating film left in the bank-like fashion only on the video signal line for improving the performance with aperture factor improvement, the step in this part is increased. Therefore, at the rubbing time the orientation becomes non-uniform in this part, and the initial orientation is disturbed. Such disturbance is observed as light leakage from the sides of the step part. In the IPS system which adopts normally black drive, the disturbance of the initial orientation causes light leakage in the vicinity of the step of the third insulating film at the black display time. Therefore, the black luminance is increased to lead to contrast reduction.

SUMMARY OF THE PRESENT INVENTION

According to an aspect of the present invention, there is provided a liquid crystal display device of lateral electric field type comprising a first substrate including a plurality of scanning signal lines, a plurality of common signal lines extending parallel to the scanning signal lines, a plurality of video signal lines crossing the scanning signal lines and the common signal lines and thin film transistors each formed in correspondence to each of the intersections of the signal lines, a second substrate facing the first substrate, and a liquid crystal layer sandwiched between the first and second substrates, pixels each being formed in each of the areas defined on the first substrate by the scanning signal lines and the video signal lines, pixel electrodes each being connected to the thin film transistor corresponding to each pixel, a common electrode being provided to provide a reference potential to the plurality of pixels, wherein: a substantially bank-like insulating film is formed on the video signal line and covered by the common electrode, and a light shield electrode is formed underneath the video signal line.

The light shield electrode is disposed on each side of the video signal line and is not electrically connected to any other signal electrode. The light shield electrode is disposed on each side of the video signal line and is electrically connected to the common signal line. The light shield electrode is disposed on one side of the video signal line and is not electrically connected to any other signal electrode. The light shield electrode is disposed on one side of the video signal line and is electrically connected to the common signal line. The light shield electrode is disposed only on the side of the video signal line corresponding to the rubbing inlet side when executing a rubbing process on the first substrate. In the area in which the video signal line is covered by the common electrode, the extent of extension of the common electrode from each edge of the video signal line is at least 4 μm. On a part of the second substrate facing the video signal line, color layers of different colors overlap, and no black matrix layer is formed. The video signal line, the pixel electrode, the common electrode and the substantially bank-like insulating layer formed on the first substrate are bent in a zigzag fashion.

The color layers formed on the second substrate are bent to match the bent shape of the video signal line formed on the first substrate. On the first substrate the light shield electrode is disposed only on one side of the video signal line, which side is the rubbing inlet side with respect to the zigzag shape of the video signal line. On the first substrate the light shield electrode is disposed on the side of the video signal line, which is changed for each bending apex thereof, and electrically connected to the common signal line. In the area in which the video signal line is perfectly covered by the common electrode, wherein the width of the bank-like insulating film formed on the video signal line is greater than the width of the video signal line and less than the width of the common electrode.

Other objects and features will be clarified from the following description with reference to attached drawings.

BRIEF DESCRIPTION OF THE DRAWINGS

FIG. 5A is a plan view showing the detailed arrangement, with respect to one pixel, of a fourth embodiment of the liquid crystal display device according to the present invention;

FIG. 7B is a plan view showing the detailed arrangement, with respect to one pixel, of the sixth embodiment of the liquid crystal display device according to the present invention, with omission of a common electrode and a substantially bank-like third insulating film;

PREFERRED EMBODIMENTS OF THE PRESENT INVENTION

Preferred embodiments of the present invention will now be described with reference to the drawings.

Figure 1:
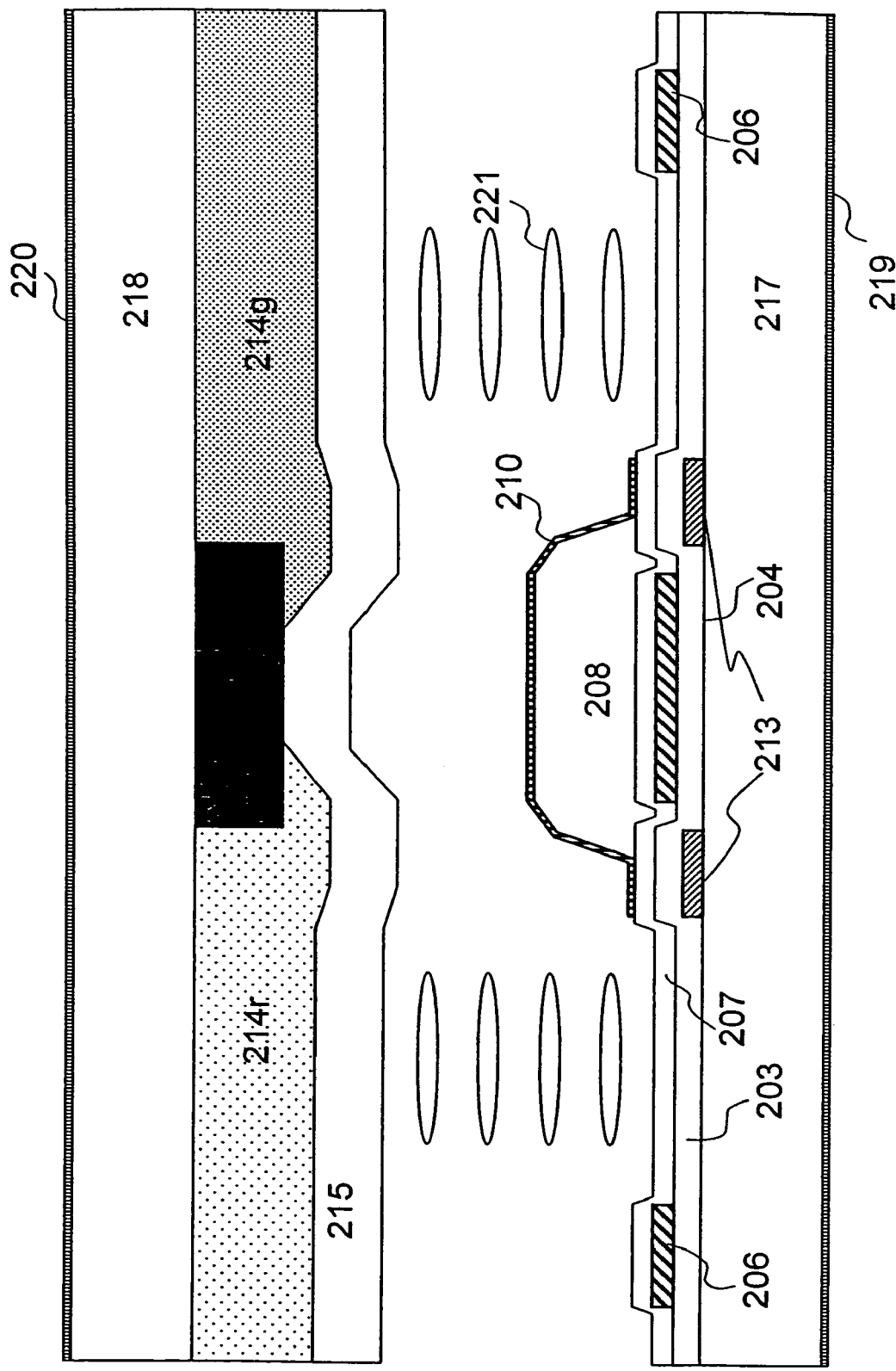
FIG. 1 is a sectional view showing the neighborhood of a video signal line in a first embodiment of the liquid crystal display device according to the present invention.
Figure 2A:
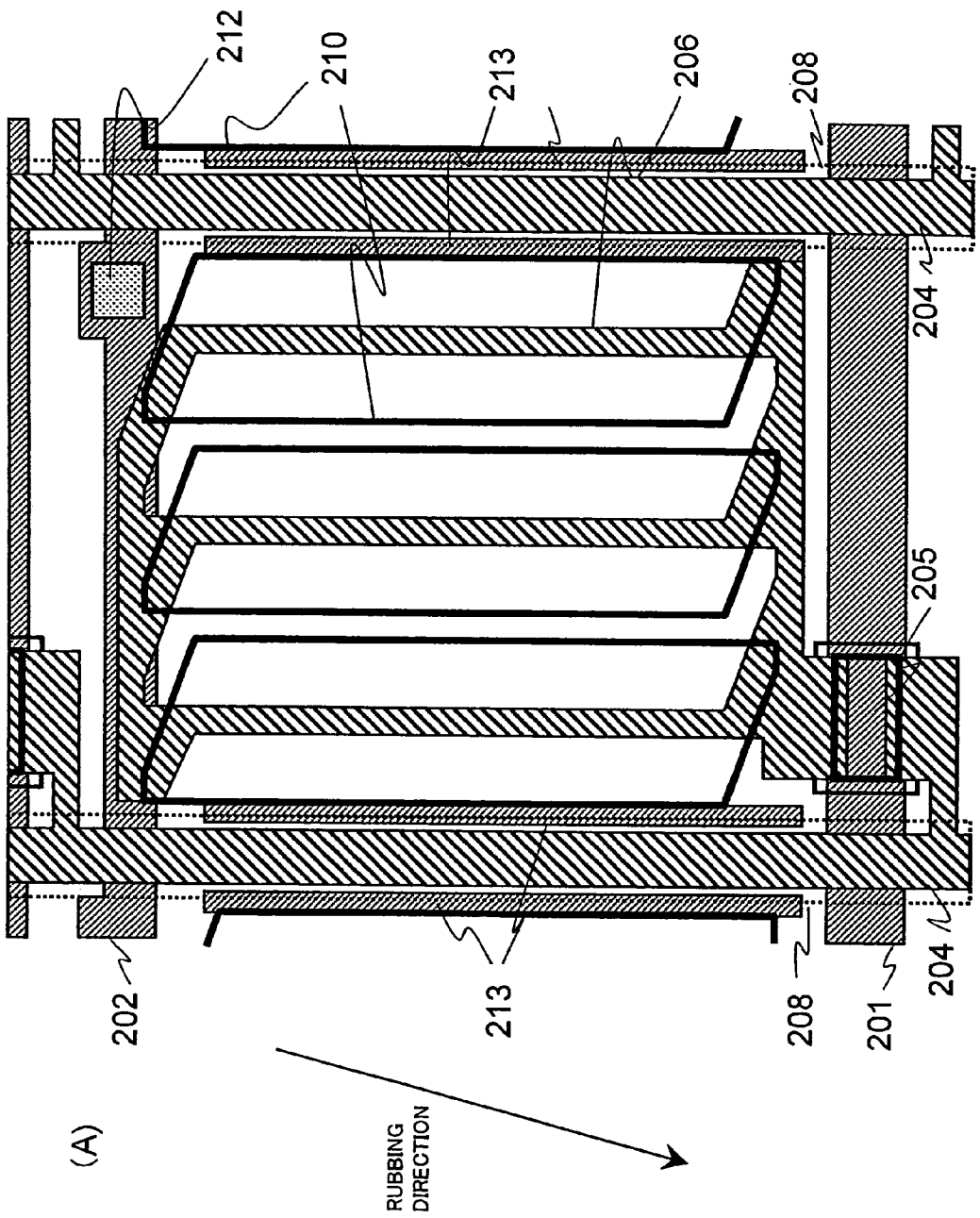
FIG. 2A is a plan view showing the detailed arrangement, with respect to one pixel, of the first embodiment of the liquid crystal display device according to the present invention.
Figure 2B:
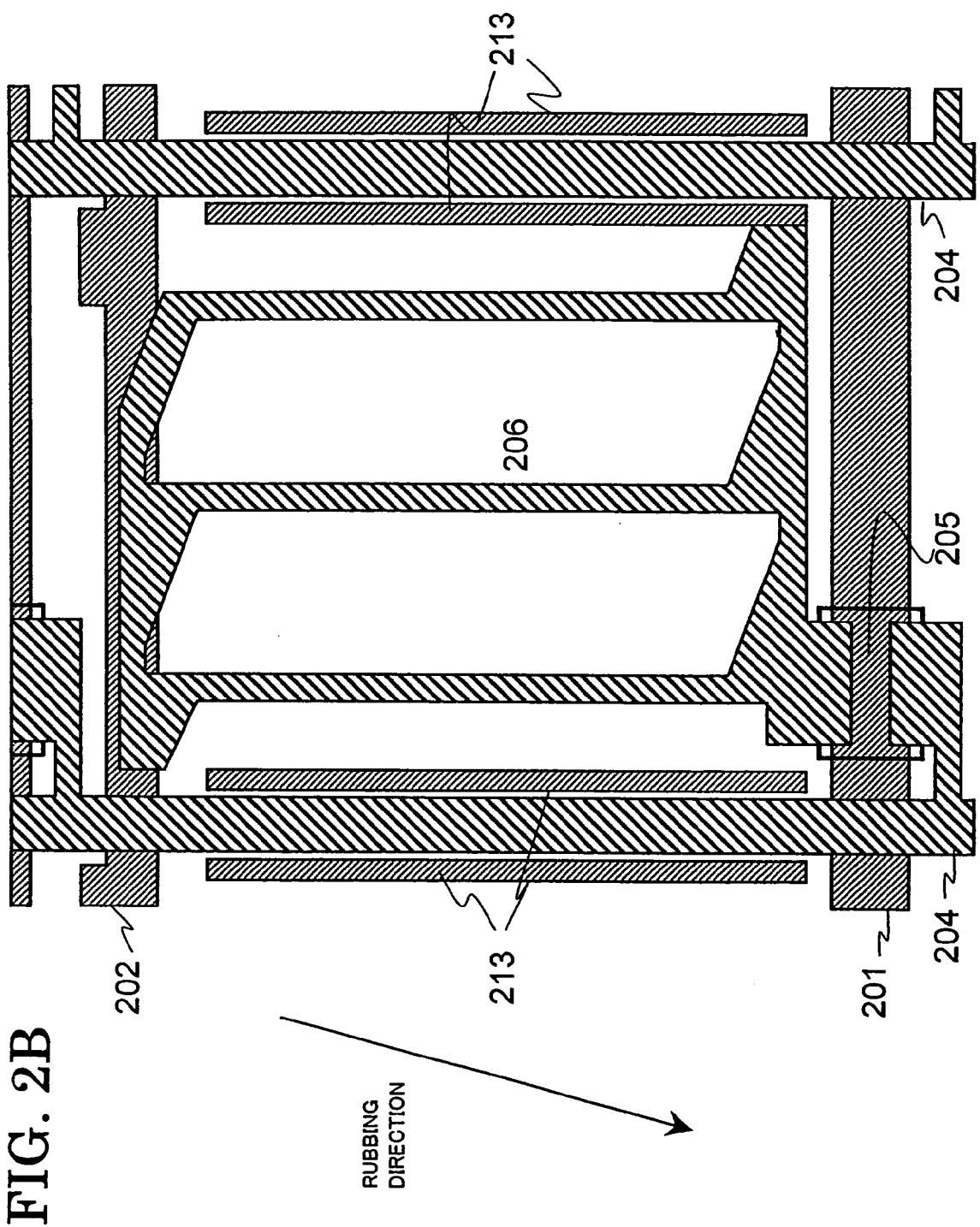
FIG. 2B is a plan view showing the detailed arrangement, with respect to one pixel, of the first embodiment of the liquid crystal display device according to the present invention, with omission of a common electrode and a bank-like third insulating film.

FIGS. 1, 2A and 2B show a first embodiment of the liquid crystal display device according to the present invention. FIG. 2A is a plan view showing one pixel of the first embodiment of the liquid crystal display device according to the present invention. FIG. 2B is a plan view of the embodiment with omission of a common electrode and bank-like third insulating films formed on video signal lines. FIG. 1 is a sectional view showing the neighborhood of a video signal line shown in FIG. 2A.

On a first substrate are formed a scanning signal line 201, a common signal line 202 extending parallel therewith and light shield electrodes 213 disposed adjacent to the opposite sides of a video signal line to be described later. These lines and electrodes are obtained from a first metal layer. The light shield electrodes 213 are not connected to any other electrode. A first insulating film is formed on the scanning signal line 201, the common signal line 202 and the light shield electrodes 213. On the first insulating film is formed a pixel electrode 206, which is integral with the video signal line 204 noted above, a thin film transistor 205 and a source electrode is formed. The pixel electrode 206 is formed from a second metal layer. This arrangement does not require any pixel electrode contact hole.

A second insulating film 207 is formed on the pixel electrode 206 integral with the video signal line 204, the thin film transistor 205 and the source electrode. A third insulating film 208 is coated on the second insulating film 207. If a common electrode 210 which is a transparent electrode is formed on the third insulating film 208, the drive voltage is greatly increased because it is a comb-teeth line. Accordingly, for the purpose of reducing the load capacity, preliminarily the third insulating film 208 is formed by removing its part on the display area, that is, it is left only on the video signal line 204. The third insulating film 208 may be transparent or colored. For example, the third insulating film 208 may be formed to a thickness of 1.5 μm from acrylic resin with a dielectric factor of 3.3.

The common electrode 210 consisting of the transparent electrode is then formed. The common electrode 210 is electrically connected via a contact hole 212 to the common signal line 202. The extent of extensions of the common electrode 210 from the video signal electrode edges, is set to 4 μm. As shown in FIG. 1, a color filter 214 is formed on a second substrate 218.

Orientation films are formed on the inner surfaces of the first and second substrates 217 and 218, respectively, and then rubbing processed. In the first substrate 217, the rubbing direction, as shown by arrow in FIG. 2A, is set at an angle of 15 degrees with respect to the video signal line 204. In the second substrate 218, the rubbing direction is set to be converse to the rubbing direction of the first substrate 217 on the plan view of FIG. 2A. The first and second substrates 217 and 218 are then applied together to seal liquid crystal 221. Polarizing members 219 and 220 are then applied to the outer surfaces of the first and second substrates 217 and 218, respectively. The polarization axes of the polarizing members 219 and 220 on the sides of the first and second substrates 217 and 218, are set to be perpendicular and parallel, respectively, to the initial orientation direction of the liquid crystal 221.

At the time of rubbing, the third insulating film 208 has a step effect to result in non-uniform orientation and generation of orientation disturbance in this part. This causes reduction of the contrast at the time of black display. With the light shield electrodes 213 provided in this part, however, it is possible to hold the black luminance to be low. The light shield electrodes 213 are not connected to any other electrode, but are in the floating state. Thus, the light shield electrodes 213 have less electric adverse effects on any other electrode and do not bring about any line delay or the like. Also, the light shield electrodes 213 are disposed to be accommodated underneath the extensions of the common electrode 210 from the video signal line edges. Thus, the reduction of the effective aperture factor is minimized.

Figure 3A:
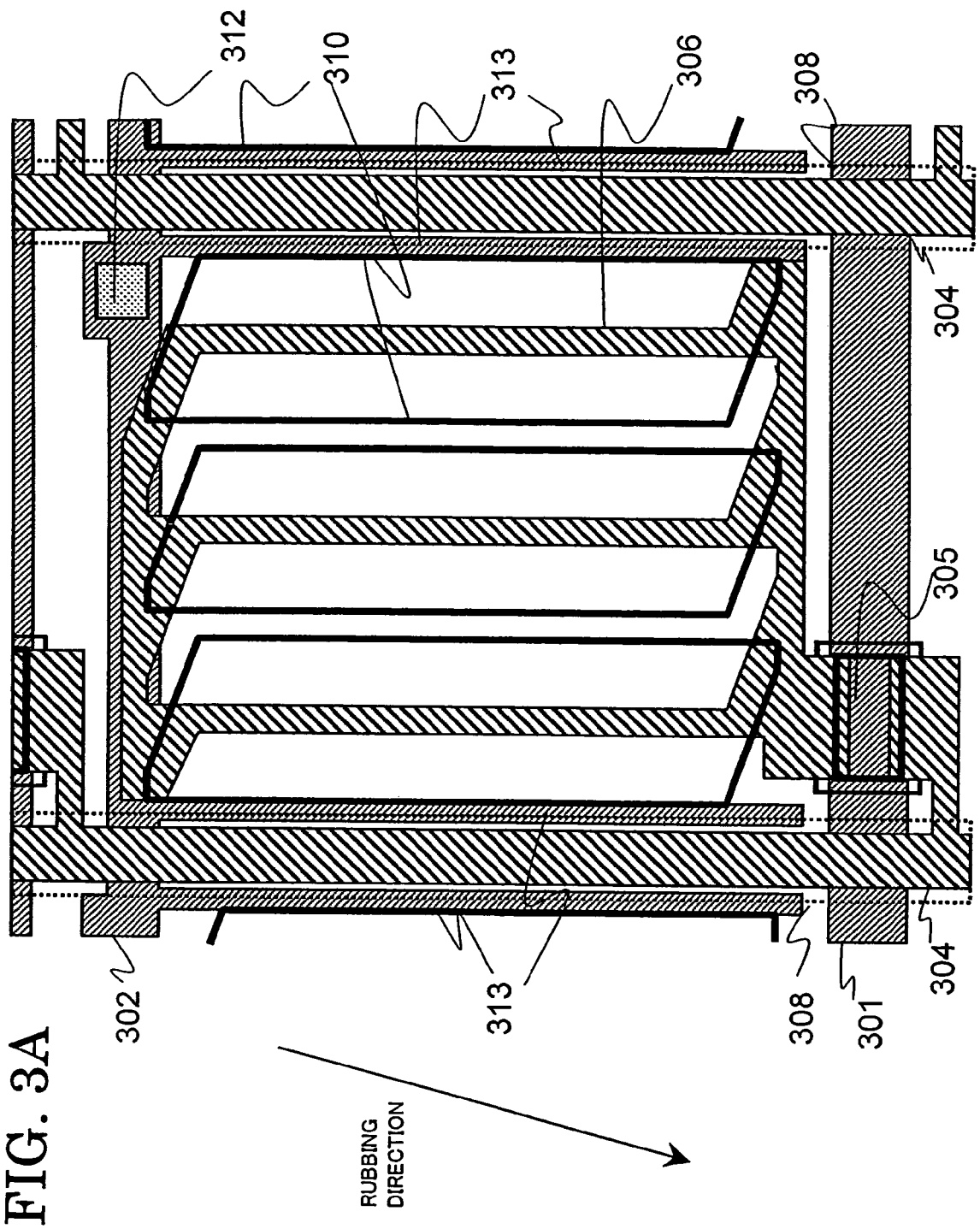
FIG. 3A is a plan view showing the detailed arrangement, with respect to one pixel, of a second embodiment of the liquid crystal display device according to the present invention.
Figure 3B:
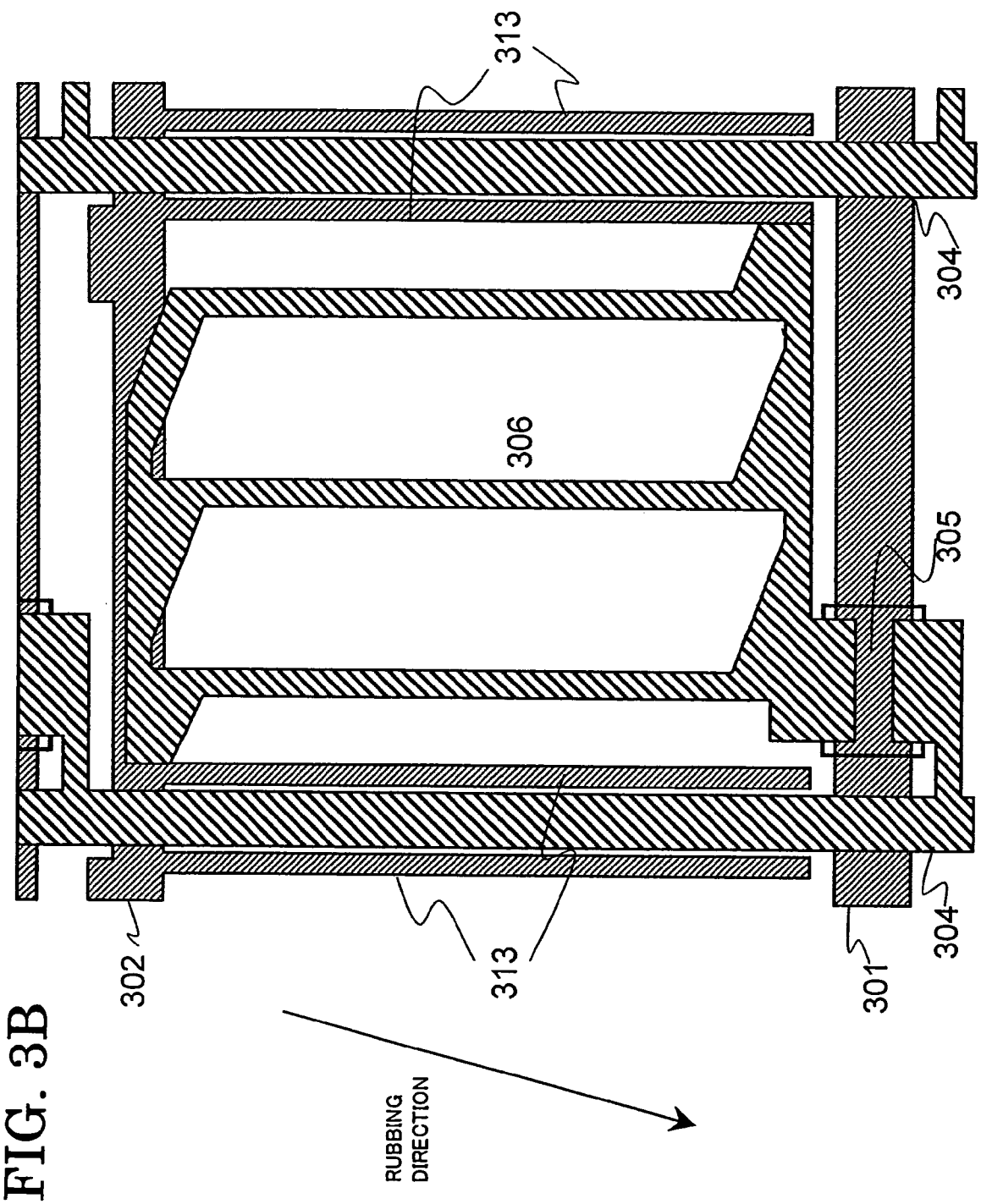
FIG. 3B is a plan view showing the detailed arrangement, with respect to one pixel, of the second embodiment of the liquid crystal display device according to the present invention, with omission of a common electrode and a substantially bank-like third insulating film.

A second embodiment of the liquid crystal display device according to the present invention will be described with reference to FIGS. 3A and 3B. In the following embodiment, elements like those in the preceding first embodiment are designated by like reference numerals, and the description will be made mainly with reference to the difference from the first embodiment. FIG. 3A is a plan view showing one pixel, and FIG. 3B is also a plan view but with omission of a substantially bank-like third insulating film formed on a common electrode and a video signal line in order to clarify the disposition of light shield electrodes. A scanning signal line 301 and a common signal line 302 are formed from the same layer. Light shield electrodes 313 are disposed on the opposite sides of a video signal line 304. The light shield electrodes 313 are connected to the common communication signal line 302 and held at a common potential. With this arrangement, a high light shield effect is obtainable. In addition, with the light shield electrodes 313 connected to the common electrode 310, it is possible to shield the electric field of the video signal line 304 more effectively and also further improve the crosstalk reduction effect. The light shield electrodes 313 are disposed to be accommodated underneath the extensions of the common electrode 310 from the video signal line edges, and the reduction of the effective aperture factor is minimized.

Figure 4A:
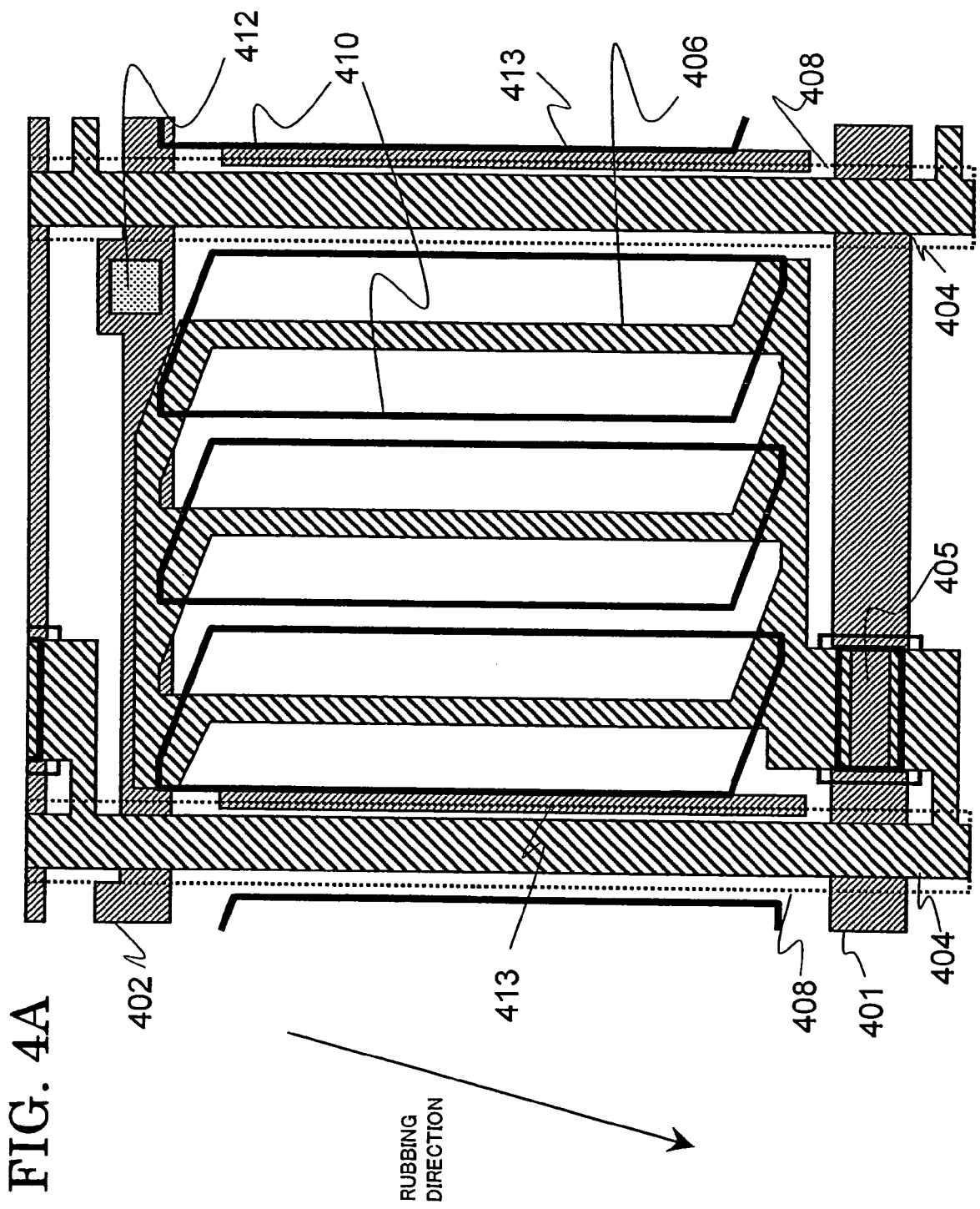
FIG. 4A is a plan view showing the detailed arrangement, with respect to one pixel, of a third embodiment of the liquid crystal display device according to the present invention.
Figure 4B:
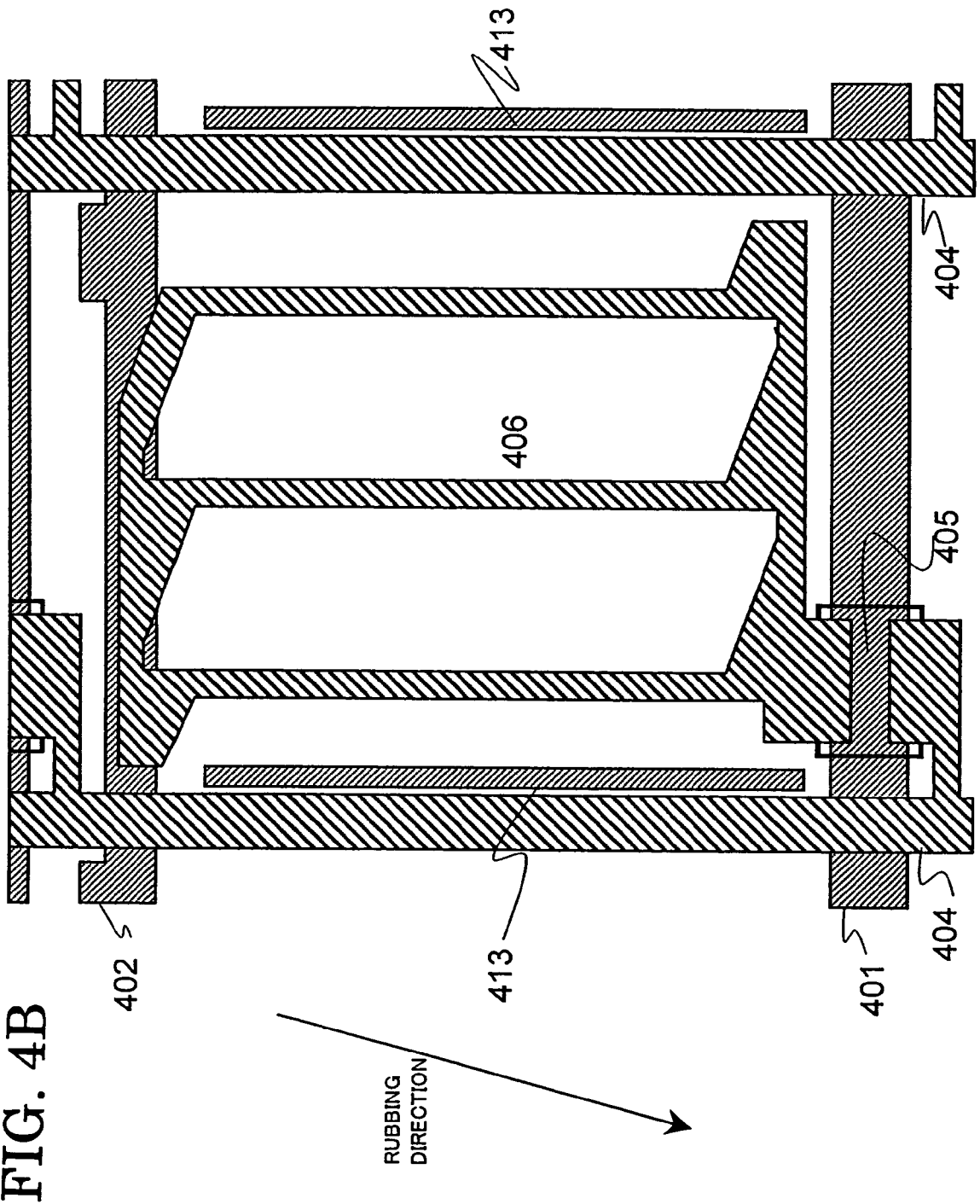
FIG. 4B is a plan view showing the detailed arrangement, with respect to one pixel, of the third embodiment of the liquid crystal display device according to the present invention, with omission of a common electrode and a substantially bank-like third insulating film.

FIGS. 4A and 4B show a third embodiment of the liquid crystal display device according to the present invention. FIG. 4A is a plan view showing one pixel, and FIG. 4B is also a plan view but with omission of a bank-like third insulating film formed on a common electrode and a video signal line in order to clarify the disposition of a light shield electrode. A scanning signal line 401 and a common signal line 402 are obtained from the same layer. Light shield electrode 413 is disposed on the rubbing inlet side of a video signal line 404. This is made so because in the case of doing the rubbing such as to stride the step, light leakage in the step part on the rubbing inlet side remains even by optimizing the rubbing conditions. The light shield electrode 413 is not connected to any other electrode, but is in the floating state.

Since light is shielded only on the light leakage occurrence side, the effective aperture factor reduction is improved compared to the double side light shielding. Also, it is possible to reduce the load capacity between the light shield electrode 413 and the video signal line 404. This means that it is possible to suppress delay in the common electrode line 402 and reduce the accompanying lateral crosstalk or the like.

Figure 5B:
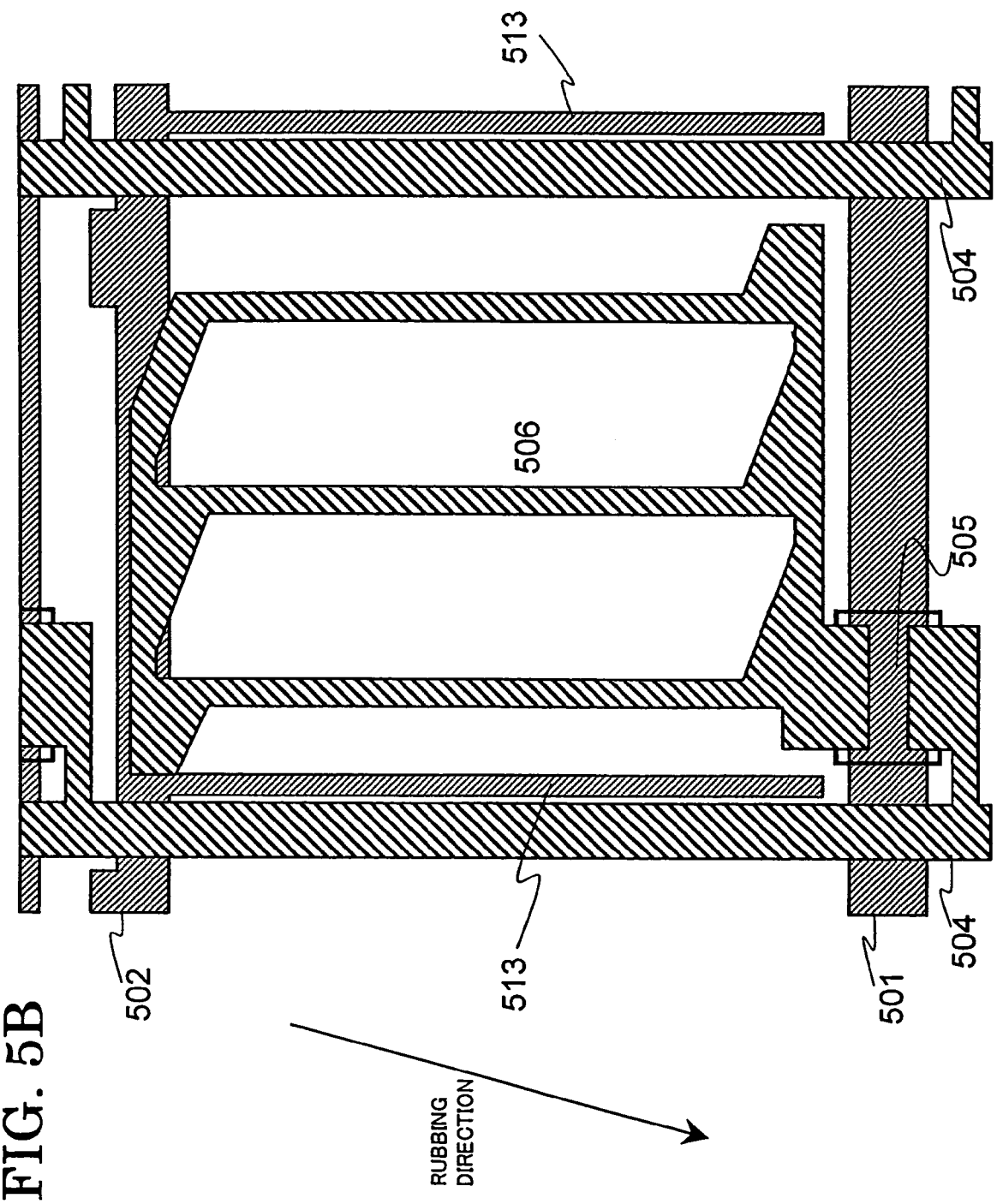
FIG. 5B is a plan view showing the detailed arrangement, with respect to one pixel, of the fourth embodiment of the liquid crystal display device according to the present invention, with omission of a common electrode and a substantially bank-like third insulating film.

A fourth embodiment of the liquid crystal display device according to the present invention will now be described with reference to FIGS. 5A and 5B. FIG. 5A is a plan view showing one pixel, and FIG. 5B is also a plan view but with omission of a bank-like third insulating film formed on a common electrode and a video signal electrode in order to clarify the disposition of a light shield electrode. A scanning signal line 501 and a common signal line 502 are obtained from the same layer. A light shield electrode 513 is disposed on the rubbing inlet side of a video signal line 504. This is made so because in the case of doing the rubbing such as to stride the step, light leakage in the step part on the rubbing inlet side remains even by optimizing the rubbing condition. The light shield electrode 513 is connected to the common signal line 502 and held at the same potential.

Since light is shielded only on the light leakage occurrence side, the actual aperture factor reduction can be improved compared to the case of the double side light shielding. Also, although not so much as in the second embodiment, with the light shield electrode 513 connected to the common electrode, it is possible to effectively shield the electric field from the video signal line and have the effect of reducing the lateral crosstalk.

Figure 6A:
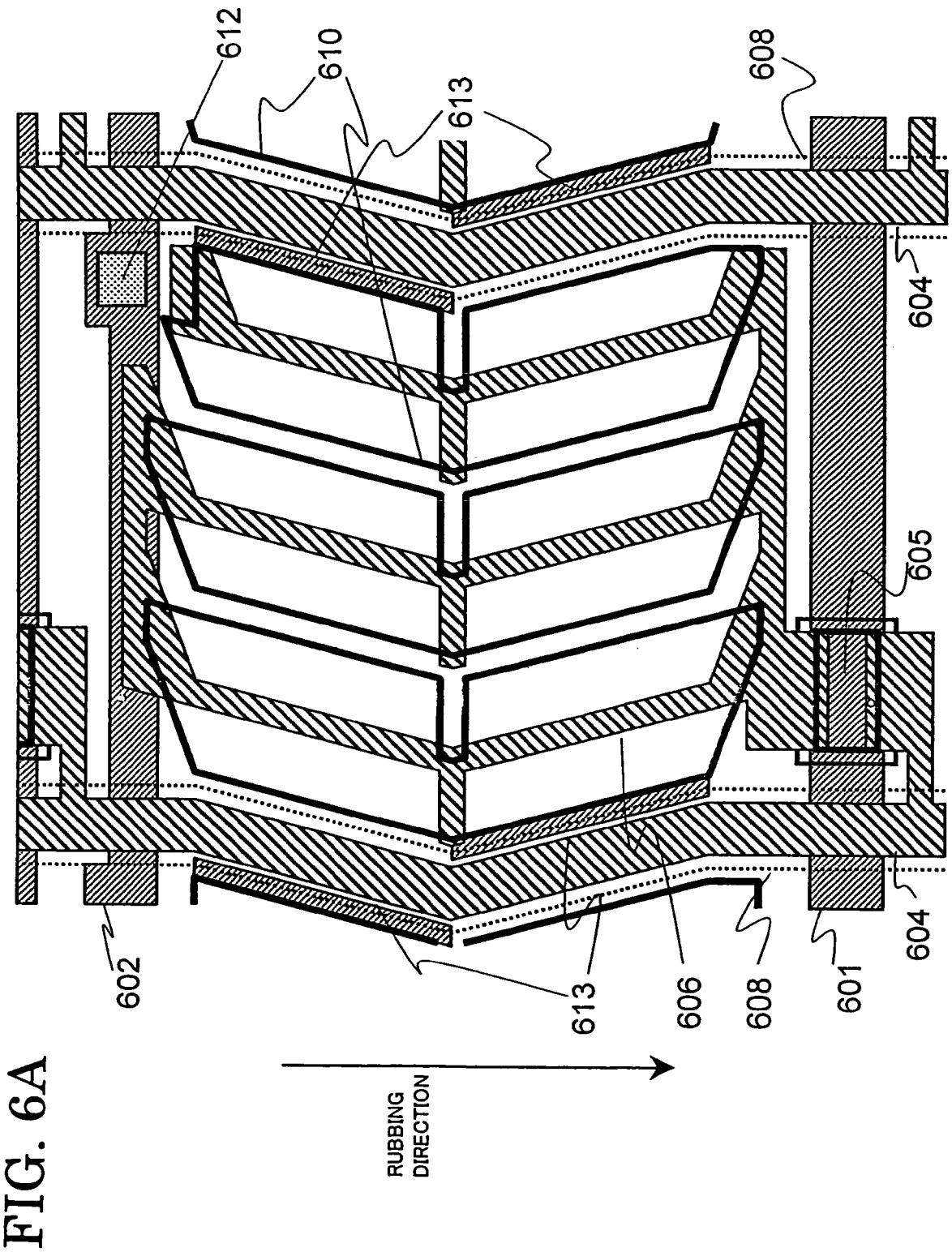
FIG. 6A is a plan view showing the detailed arrangement, with respect to one pixel, of a fifth embodiment of the liquid crystal display device according to the present invention.

A fifth embodiment of the liquid crystal display device according to the present invention will now be described with reference to FIGS. 6A and 6B. FIG. 6A is a plan view showing one pixel, and FIG. 6B is also a plan view but with omission of a bank-like third insulating film formed on a common electrode and a video signal electrode in order to clarify the disposition of light shield electrodes.

Figure 6B:
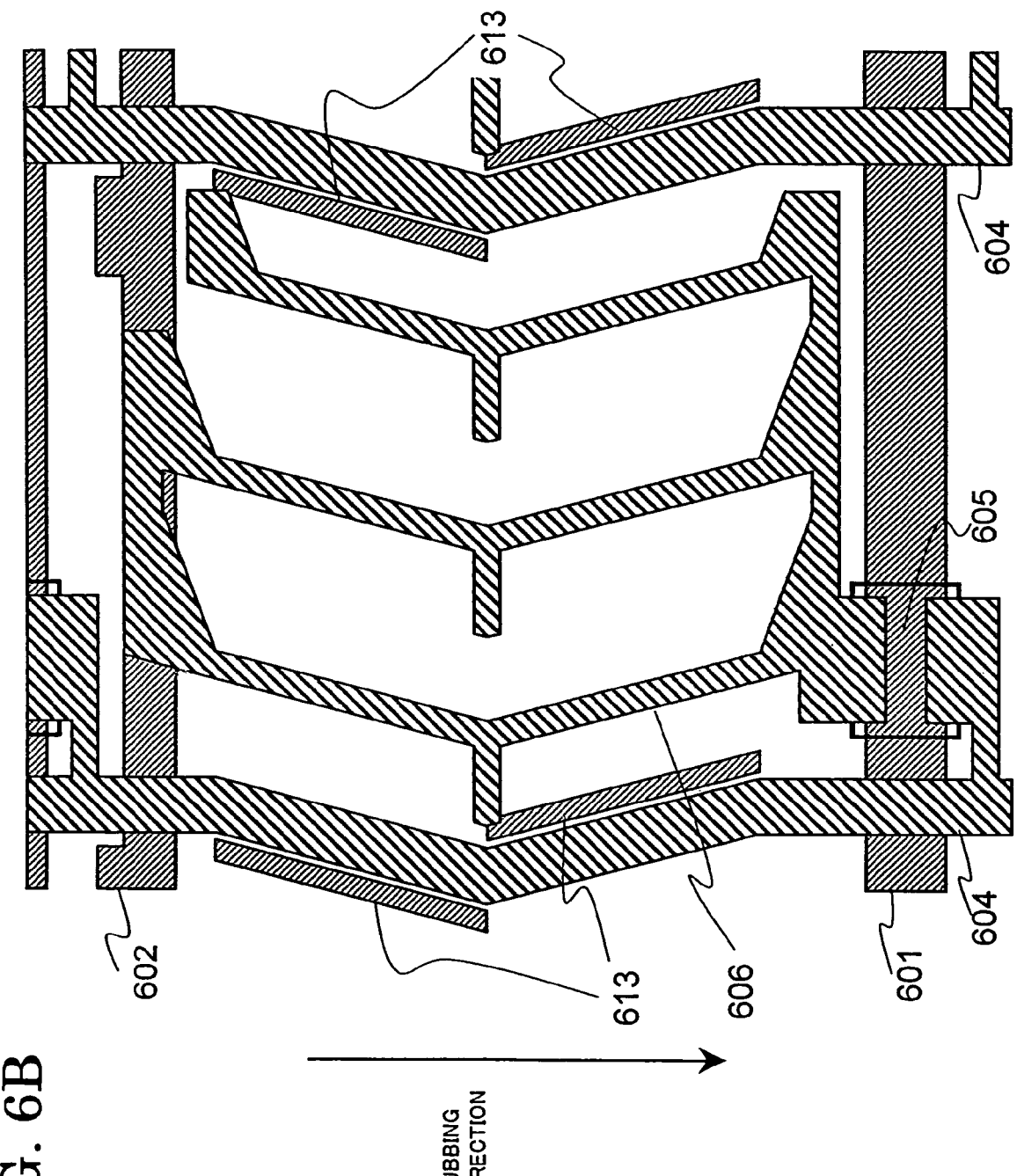
FIG. 6B is a plan view showing the detailed arrangement, with respect to one pixel, of the fifth embodiment of the liquid crystal display device according to the present invention, with omission of a common electrode and a substantially bank-like third insulating film.

As is seen from FIGS. 6A and 6B, this fifth embodiment is an example of a so-called multiple domain system. Specifically, a video signal line 604, a pixel electrode 606 and a common electrode 610 are bent in a zigzag fashion. Although in this embodiment the bending is made only once, it is possible to make a number of times of bending as well. The rubbing direction is the perpendicular direction. The direction of rotation of the molecular axis of the liquid crystal is changed for each domain with the apex of bending as boundary. With this arrangement, the liquid crystal can be rotated in two directions. With rotation in two directions, compensation of the view field angle properties is obtainable. It is thus possible to further improve the view field angle properties.

In this fifth embodiment of the liquid crystal display device, the floating disposition is made by shielding light only on the rubbing inlet side. Since the video signal line 604, the pixel electrode 606 and the common electrode 610 are bent in the zigzag fashion, the rubbing inlet side is alternately the left and right sides for each bending apex. The disposition of the light shield electrodes 613 is thus as shown in FIGS. 6A and 6B. Instead of the fifth embodiment, it is also possible to combine the floating disposition with the double side light shielding. In this case, merely electrodes may be disposed on both sides.

Figure 7A:
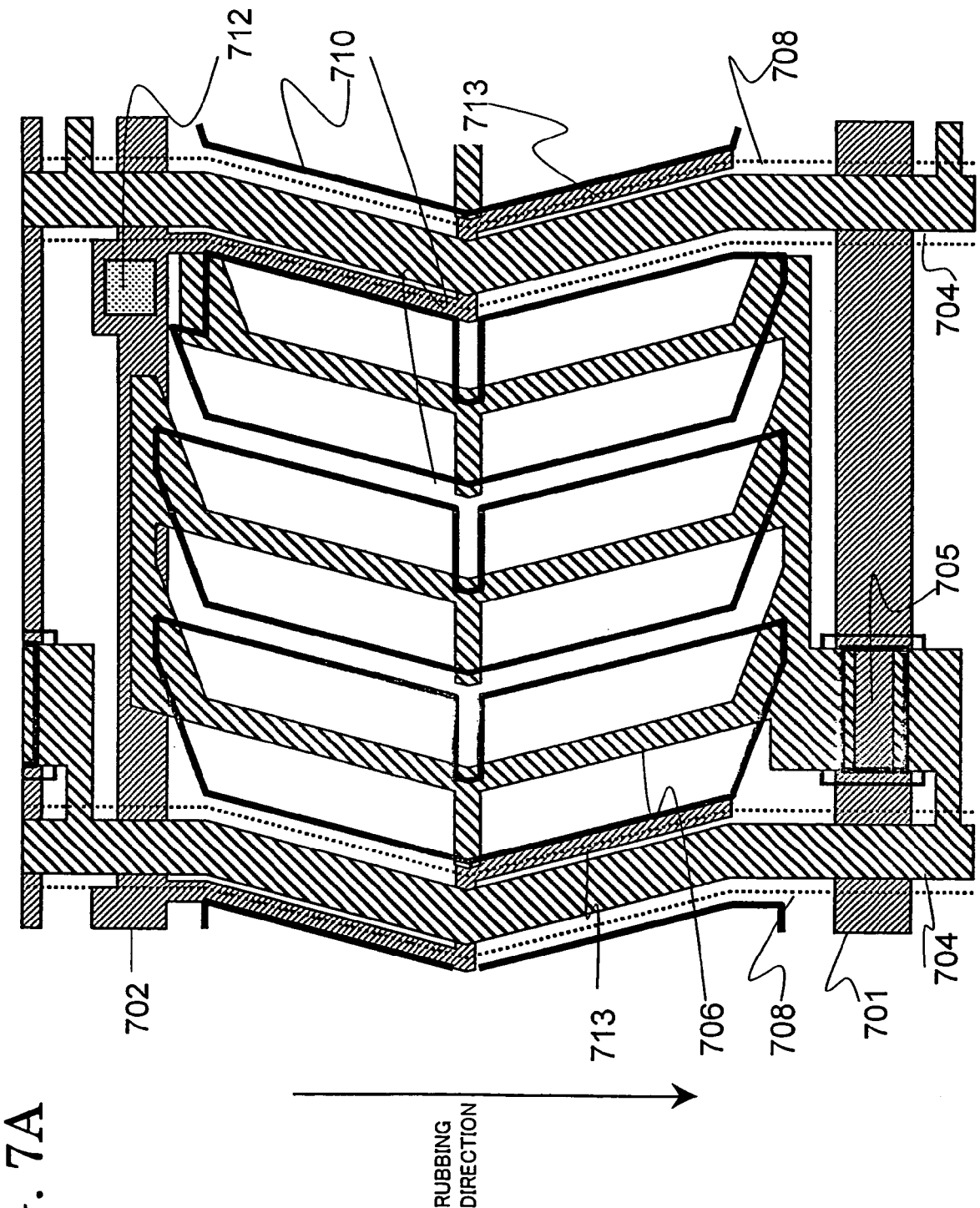
FIG. 7A is a plan view showing the detailed arrangement, with respect to one pixel, of a sixth embodiment of the liquid crystal display device according to the present invention.

FIGS. 7A and 7B show a sixth embodiment of the liquid crystal display device according to the present invention. FIG. 7A is a plan view showing one pixel, and FIG. 7B is also a plan view, but with omission of a bank-like third insulating film formed on a common electrode and a video signal electrode and without shading of a video signal electrode and a pixel electrode.

The liquid crystal display device shown in FIGS. 7A and 7B is an example of a so-called multiple drain system. Specifically, a video signal line 704, a pixel element 706 and a common electrode 710 are bent in a zigzag form. In this sixth embodiment the bending is made once. However, it is possible to make a number of times of bending. The rubbing direction is the perpendicular direction. The direction of rotation of the molecular axis of the liquid crystal is changed for each domain with the bending axis as boundary.

In this sixth embodiment, light is shielded only on the rubbing inlet side, and light shield electrodes are electrically connected to the common signal line 702. With the zigzag bending of the video signal line 704, pixel electrode 706 and the common electrode 710, the rubbing inlet side is alternately changed to he left and right sides for each bending apex. As shown, the light shield electrodes 713 are disposed such that they alternately cross the video signal line at each bending apex. Instead of this sixth embodiment, it is possible as well to combing the double side light shielding with the connection of the light shield electrodes to the common signal line. In this case, merely electrodes may be disposed on the opposite sides of the video signal line, that is, they need not cross the line.

A seventh embodiment of the liquid crystal display device according to the present invention will now be described with reference to FIGS. 8 and 9.

Figure 8:
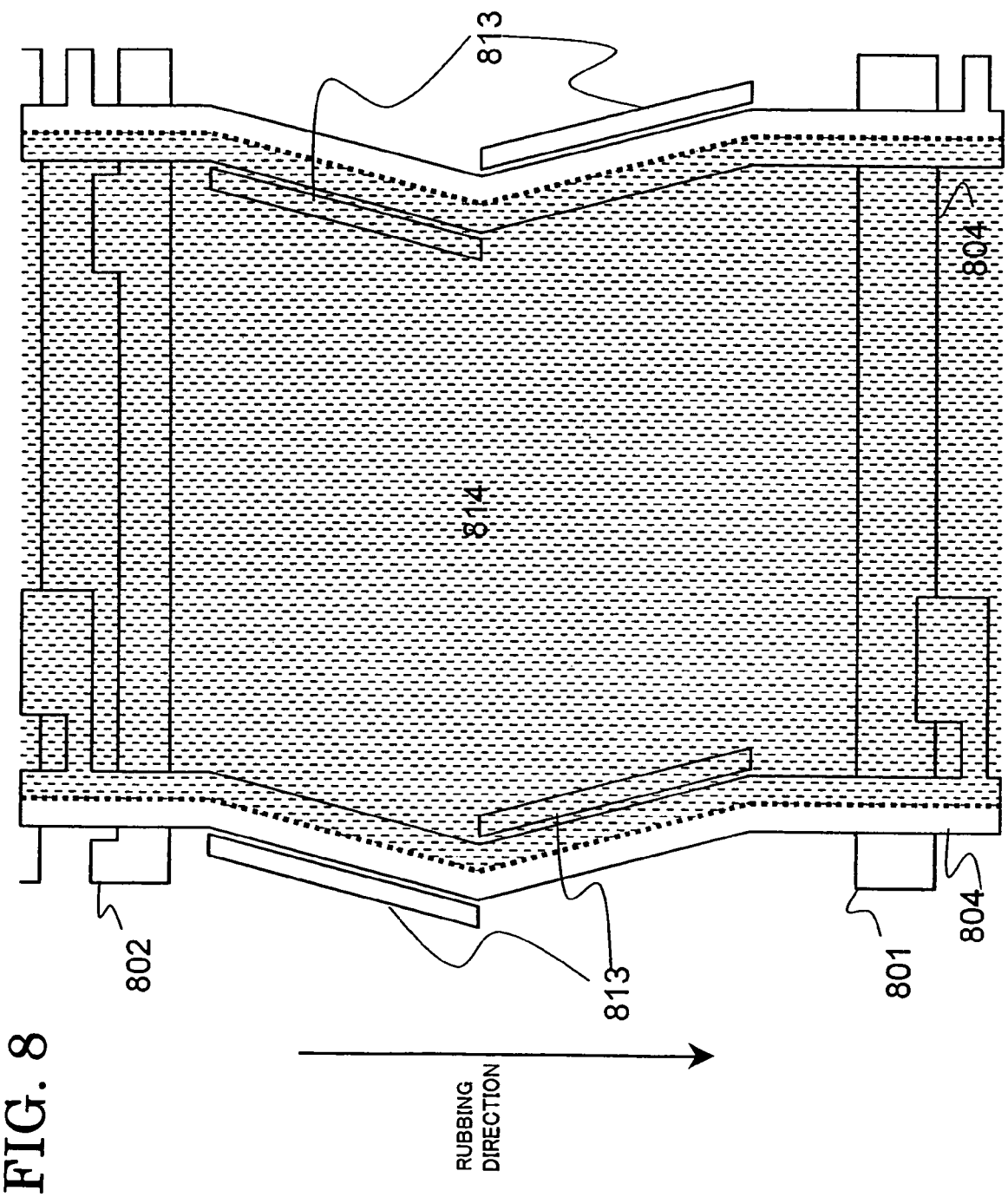
FIG. 8 is a plan view showing one pixel of a seventh embodiment of the liquid crystal display device according to the present invention, with only a scanning signal line, a video signal line and light shield electrodes being shown without shading.

FIG. 8 is a plan view showing one pixel. In order to clarify color layer disposition, only a scanning signal line, a video signal line and light shield electrodes are shown without shading. Again this embodiment is an example of a so-called multiple domain system with zigzag bending of the video signal line, the pixel electrode and the common electrode. Color layers which are formed on a second substrate are bended to mach the bent shape of elements on a first substrate. In this seventh embodiment, the light shield electrodes are of single side light shielding and in the floating disposition. However, it is possible to adapt any disposition.

Figure 9:
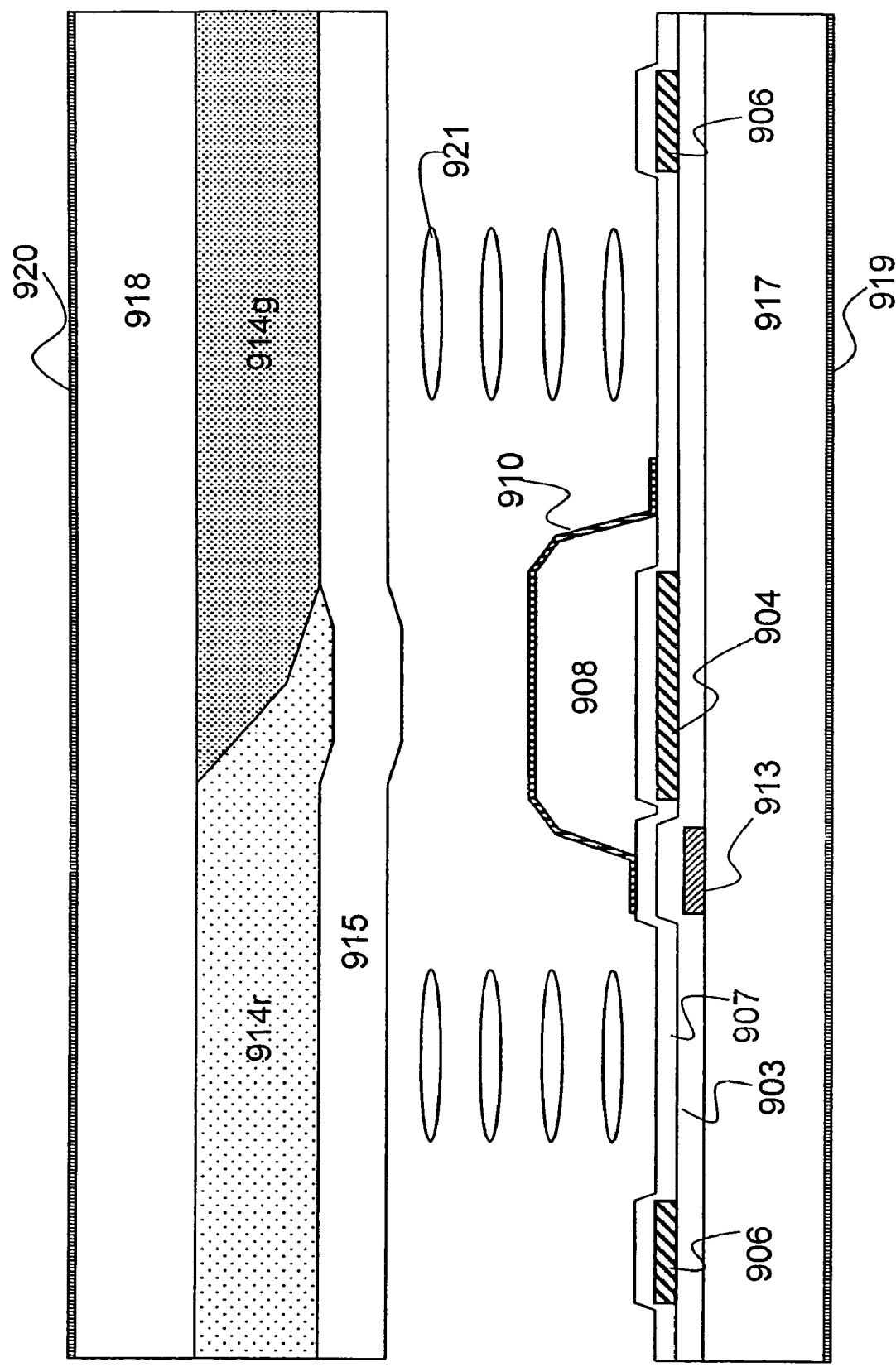
FIG. 9 is a sectional view showing the neighborhood of an eighth embodiment of the liquid crystal display device according to the present invention.
Figure 10A:
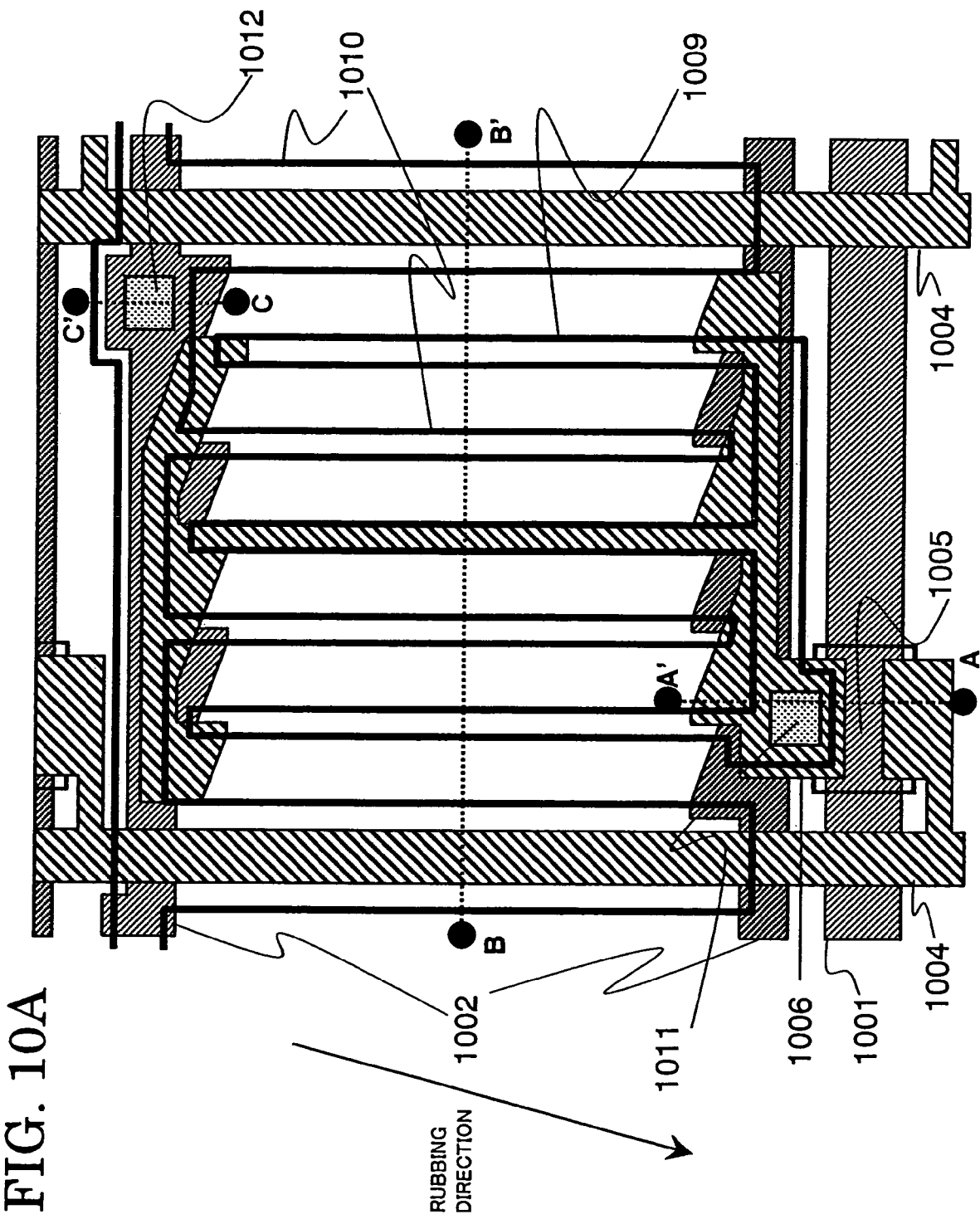
FIG. 10A is a plan view showing one pixel of a first prior art example of the liquid crystal display device.
Figure 10B:
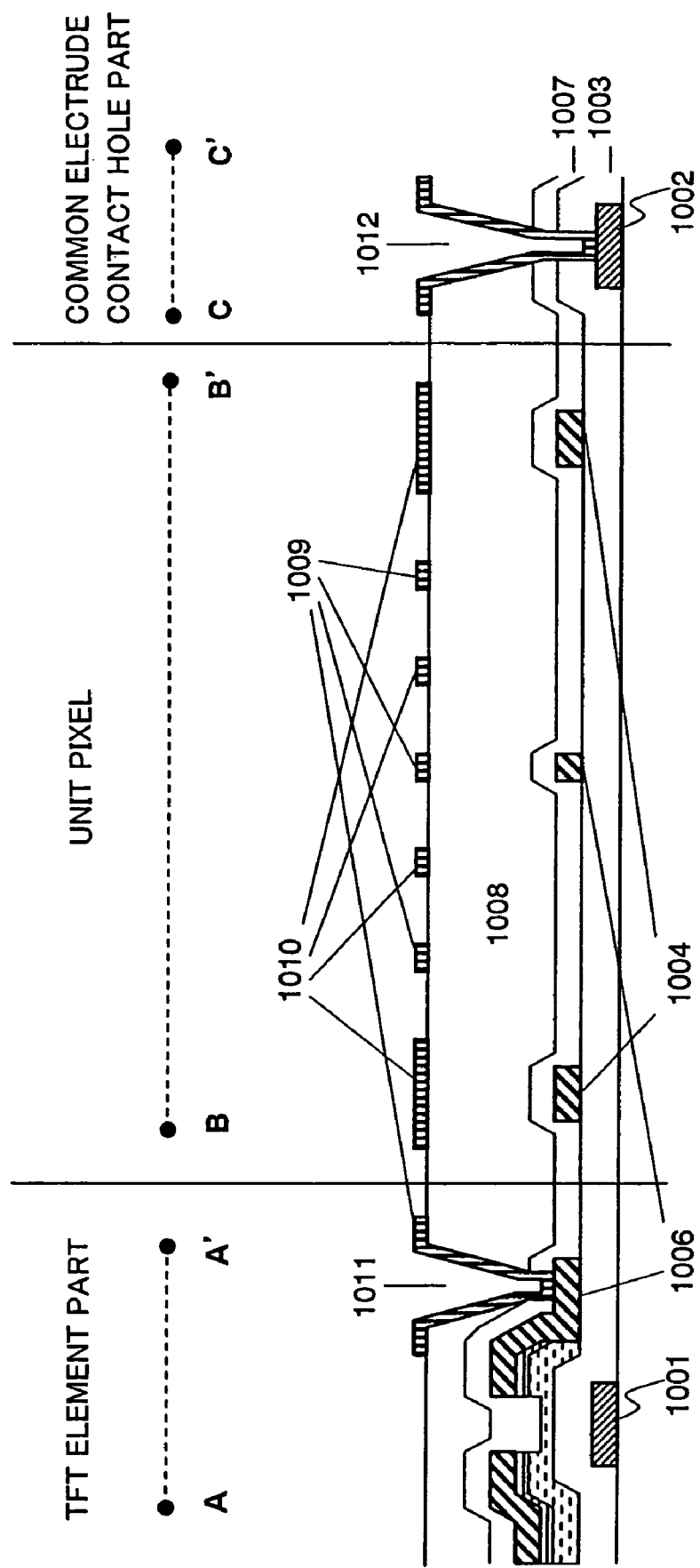
FIG. 10B is a sectional view showing one pixel of the first prior art example of the liquid crystal display device.
Figure 11A:
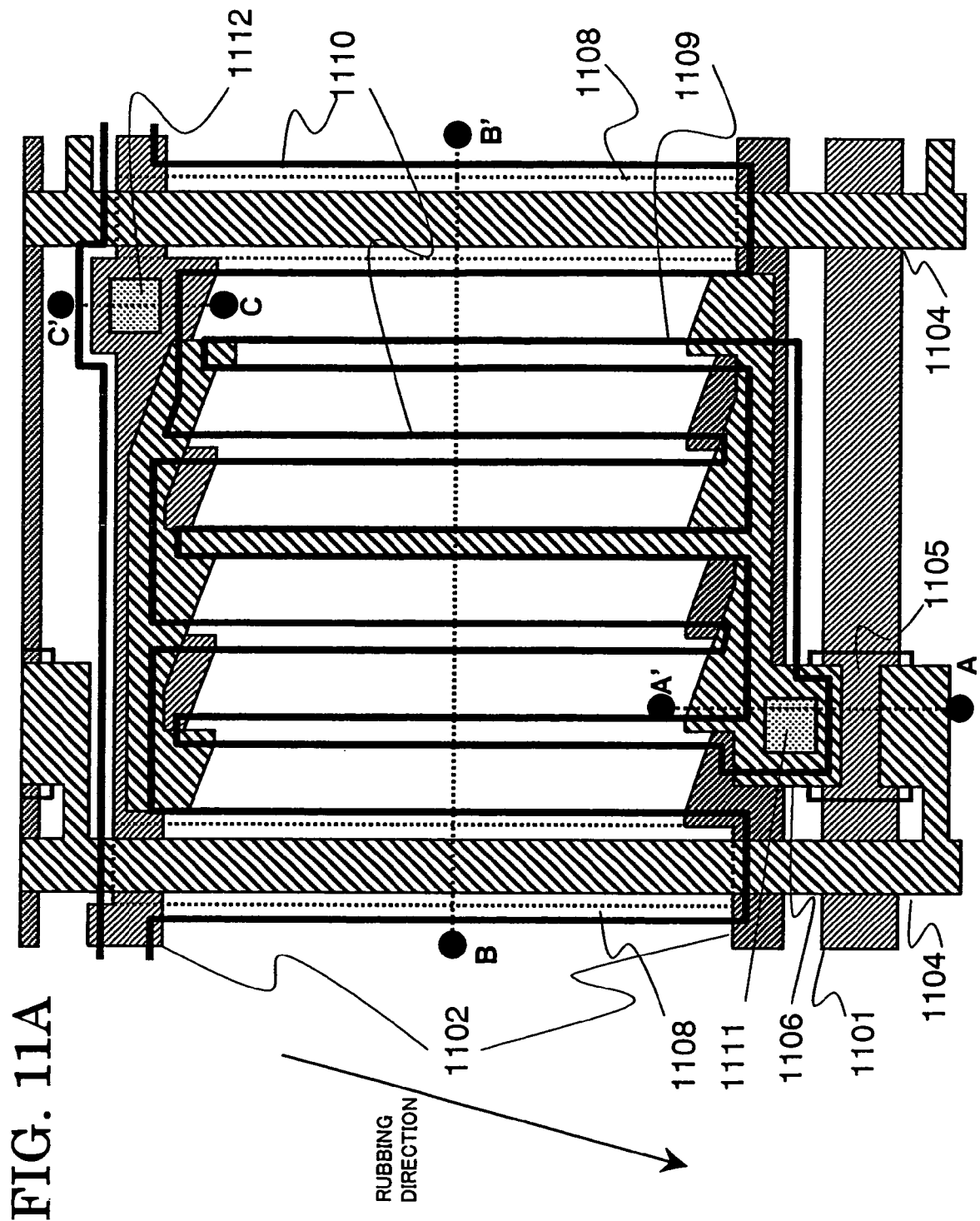
FIG. 11A is a plan view showing one pixel of a second prior art example of the liquid crystal display device.
Figure 11B:
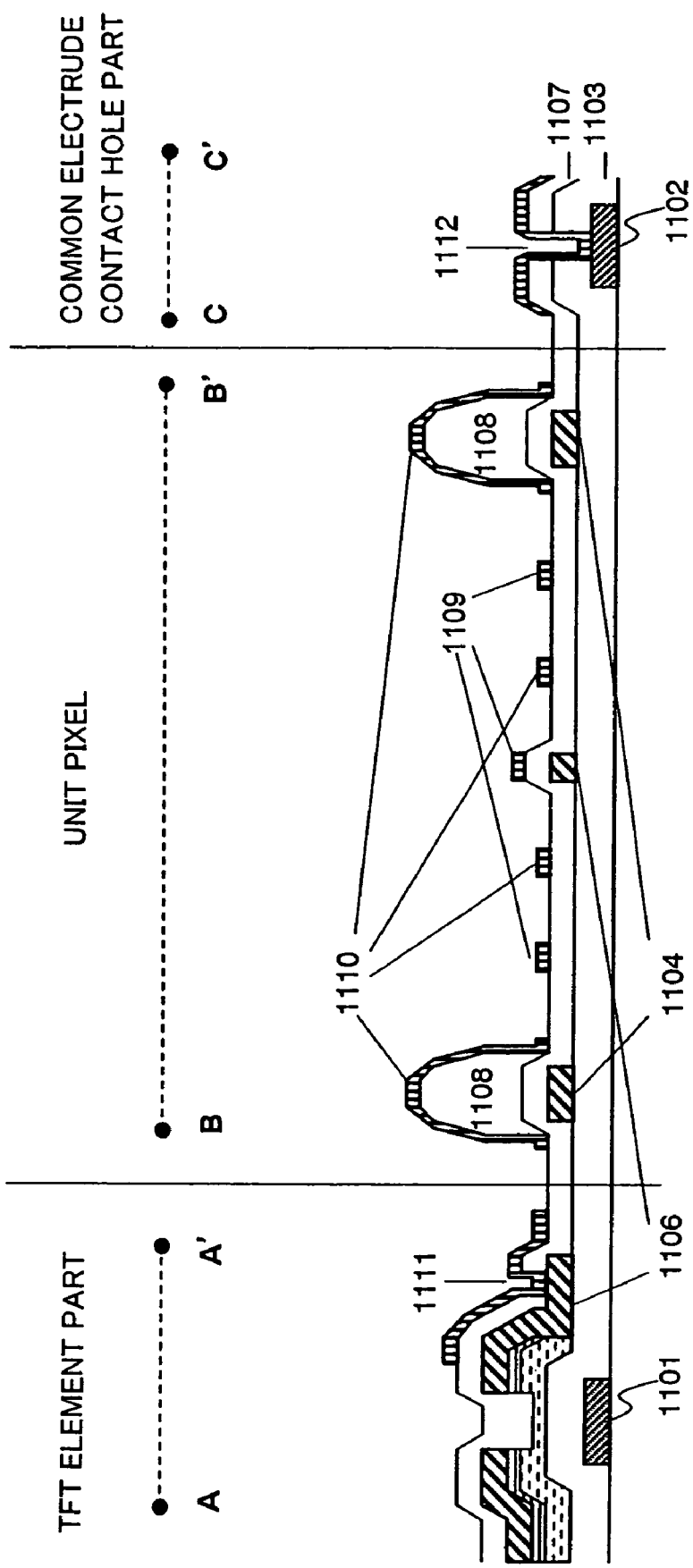
FIG. 11B is a sectional view showing one pixel of the second prior art example of the liquid crystal display device.
Figure 12A:
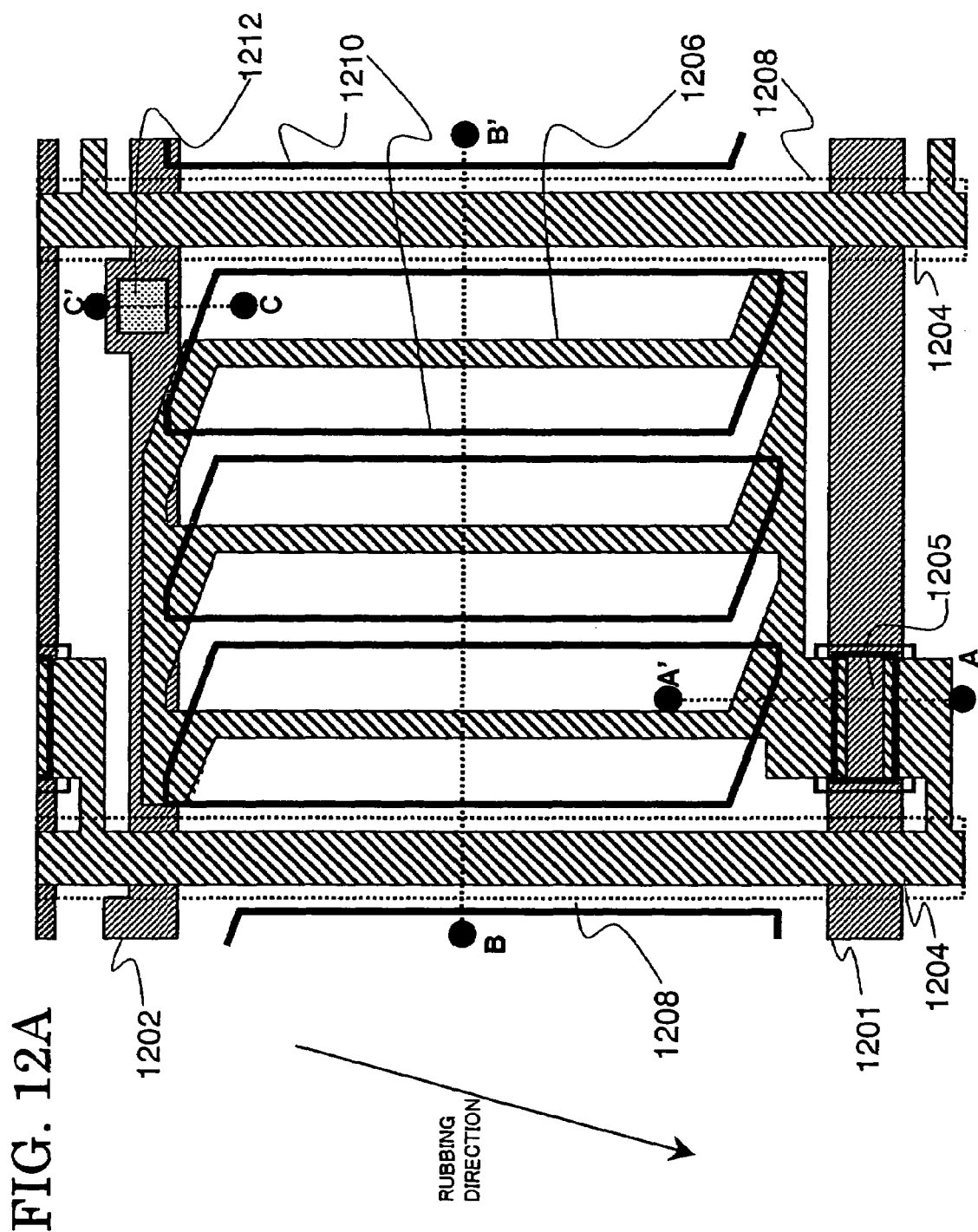
FIG. 12A is a plan view showing one pixel of a third prior art example of the liquid crystal display device.
Figure 12B:
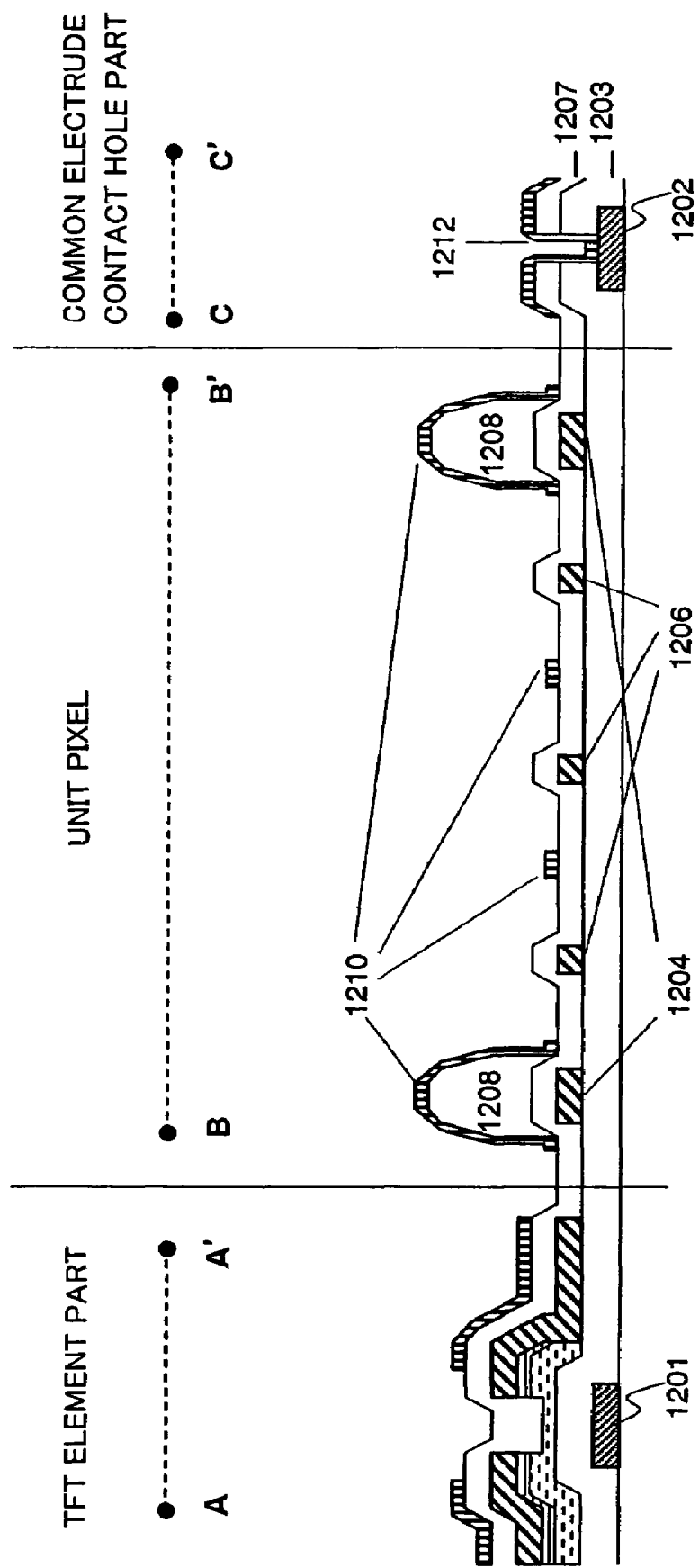
FIG. 12B is a sectional view showing the third prior art example of the liquid crystal display device.

FIG. 9 is a sectional view showing the seventh embodiment. On the second substrate 918, no black matrix layer corresponding to the black matrix layer 216 shown in FIG. 1 is provided. Instead, color layers 914*r* and 914*g* are formed such that they overlap each other in their parts corresponding to the video signal line 904. With this arrangement, high aperture factor is obtainable even in the multiple domain system. If the width of the color layer overlap part is too small, it may lead to color missing and occurrence of color mixing from an oblique sight field. When the color layer overlap part width was set to about 7 µm, no color missing resulted. Also, no color mixing between adjacent pixels occurred. With this arrangement, it is possible to reduce effects of positional deviation at the time of overlapping the first and second substrates 917, 918 of each other and thus realize a liquid crystal display device of a further improved aperture factor.

In the liquid crystal display device according to the present invention, the aperture factor is improved by forming substantially bank-like insulating films on video signal lines. With this display device, it is possible to obtain practically pronounced effects of suppressing light leaks in the vicinity of the substantially bank-like insulating films and obtaining display of high contrast and high uniformity.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A liquid crystal display device of lateral electric field type comprising:
a first substrate including a plurality of scanning signal lines;
a plurality of common signal lines extending parallel to the scanning signal lines;
a plurality of video signal lines crossing the scanning signal lines and the common signal lines and thin film transistors each formed in correspondence to each of the intersections of the signal lines;
a second substrate facing the first substrate; and
a liquid crystal layer sandwiched between the first and second substrates,
wherein a plurality of pixels each being formed in each of areas defined on the first substrate by the scanning signal lines and the video signal lines, pixel electrodes, leveled with the video signal lines, each being connected to the thin film transistor corresponding to said each of the plurality of pixels, and a common electrode being provided to provide a reference potential to the plurality of pixels,
wherein a mound-like insulating film is formed on the video signal line and covered by the common electrode, and a light shield electrode is formed underneath the video signal line, and
wherein an edge of said mound-like insulating film is positioned on said light shield electrode.

2. The liquid crystal display device according to claim 1, wherein the light shield electrode is disposed on each side of the video signal line and is not electrically connected to any other signal electrode.

3. The liquid crystal display device according to claim 1, wherein the light shield electrode is disposed on each side of the video signal line and is electrically connected to the common signal line.

4. The liquid crystal display device according to claim 1, wherein the light shield electrode is disposed on one side of the video signal line and is not electrically connected to any other signal electrode.

5. The liquid crystal display device according to claim 1, wherein the light shield electrode is disposed on one side of the video signal line and is electrically connected to the common signal line.

6. The liquid crystal display device according to claim 4, wherein the light shield electrode is disposed only on the side of the video signal line corresponding to a rubbing inlet side when executing a rubbing process on the first substrate.

7. The liquid crystal display device according to claim 1, wherein in an area in which the video signal line is covered by the common electrode, an extent of extension of the common electrode from each edge of the video signal line is at least 4 µm.

8. The liquid crystal display device according to claim 1, wherein on a part of the second substrate facing the video signal line, color layers of different colors overlap, and no black matrix layer is formed.

9. The liquid crystal display device according to claim 1, wherein the video signal line, the pixel electrode, the common electrode and the mound-like insulating layer formed on the first substrate are bent in a zigzag fashion.

10. The liquid crystal display device according to claim 9, wherein the color layers formed on the second substrate are bent to match a bent shape of the video signal line formed on the first substrate.

11. The liquid crystal display device according to claim 9, wherein on the first substrate the light shield electrode is disposed only on one side of the video signal line, which side is a rubbing inlet side with respect to the zigzag shape of the video signal line.

12. The liquid crystal display device according to claim 9, wherein on the first substrate the light shield electrode is disposed on the side of the video signal line, which is changed for each bending apex thereof, and electrically connected to the common signal line.

13. The liquid crystal display device according to claim 1, wherein in an area in which the video signal line is perfectly covered by the common electrode, wherein an width of the mound-like insulating film formed on the video signal line is greater than a width of the video signal line and less than a width of the common electrode.

14. The liquid crystal display device according to claim 5, wherein the light shield electrode is disposed only on the side of the video signal line corresponding to a rubbing inlet side when executing a rubbing process on the first substrate.

15. The liquid crystal display device according to claim 2, wherein in an area in which the video signal line is covered by the common electrode, an extent of extension of the common electrode from each edge of the video signal line is at least 4 µm.

16. The liquid crystal display device according to claim 3, wherein in an area in which the video signal line is covered by the common electrode, an extent of extension of the common electrode from each edge of the video signal line is at least 4 µm.

17. The liquid crystal display device according to claim 4, wherein in an area in which the video signal line is covered by the common electrode, an extent of extension of the common electrode from each edge of the video signal line is at least 4 µm.

18. The liquid crystal display device according to claim 5, wherein in an area in which the video signal line is covered by the common electrode, an extent of extension of the common electrode from each edge of the video signal line is at least 4 µm.

19. The liquid crystal display device according to claim 6, wherein in an area in which the video signal line is covered by the common electrode, an extent of extension of the common electrode from each edge of the video signal line is at least 4 µm.

20. The liquid crystal display device according to claim 2, wherein on a part of the second substrate facing the video signal line, color layers of different colors overlap, and no black matrix layer is formed.

* * * * *